(12) United States Patent
Smith et al.

(10) Patent No.: US 10,529,371 B1
(45) Date of Patent: Jan. 7, 2020

(54) ACTUATOR TIP CALIBRATION FOR ROBOTIC OPTICAL STORAGE SYSTEM

(71) Applicant: International Business Machines Corporation, Armonk, NY (US)

(72) Inventors: Daniel F. Smith, Santa Cruz, CA (US); David Jame Altknecht, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/173,975

(22) Filed: Oct. 29, 2018

(51) Int. Cl.
  *G11B 17/22* (2006.01)
  *G11B 17/04* (2006.01)

(52) U.S. Cl.
  CPC ............ *G11B 17/225* (2013.01); *G11B 17/04* (2013.01)

(58) Field of Classification Search
  CPC ....... G11B 17/04; G11B 17/28; G11B 17/225; G11B 17/226
  See application file for complete search history.

(56) References Cited

U.S. PATENT DOCUMENTS

| | | | |
|---|---|---|---|
| 4,173,427 A | 11/1979 | Beuch et al. | |
| 4,567,584 A * | 1/1986 | Kawakami | G11B 17/28 369/30.85 |
| 4,580,254 A * | 4/1986 | Hojyo | G11B 27/002 369/30.29 |
| 4,589,101 A * | 5/1986 | Schatteman | E05B 65/5284 369/30.7 |
| 4,599,716 A * | 7/1986 | Shimbo | G11B 17/30 369/30.54 |
| 4,608,679 A | 8/1986 | Rudy et al. | |
| 4,633,452 A * | 12/1986 | Shimbo | G11B 17/30 369/30.83 |
| 4,695,990 A * | 9/1987 | Kawakami | G11B 17/04 369/30.78 |
| 4,815,055 A | 3/1989 | Fago, Jr. et al. | |
| 4,815,057 A | 3/1989 | Miller et al. | |
| 4,831,549 A | 5/1989 | Red et al. | |
| 4,901,172 A | 2/1990 | Nakazawa et al. | |
| 4,989,191 A | 1/1991 | Kuo | |
| 5,050,020 A | 9/1991 | Campbell et al. | |

(Continued)

FOREIGN PATENT DOCUMENTS

| | | |
|---|---|---|
| CN | 102598136 A | 7/2012 |
| CN | 204149156 U | 2/2015 |

(Continued)

OTHER PUBLICATIONS

Fujie, R. et al., "6 Disc In-dash CD Changer Deck", Fujitsu Ten Tech. J., No. 14, 2000, pp. 1-8, downloaded from: https://www.denso-ten.com/business/technicaljournal/pdf/14-1.pdf.

(Continued)

*Primary Examiner* — Brian E Miller
(74) *Attorney, Agent, or Firm* — Sherman IP LLP; Kenneth L. Sherman; Steven Laut

(57) ABSTRACT

A calibration system includes a moveable arm configured for movement within an optical disc storage system. A disc kicker device includes an actuator and an actuator tip that contacts an optical disc. The disc kicker device is connected to the moveable arm. The calibration system performs a calibration operation to calibrate the actuator at the actuator tip to correct displacement error.

20 Claims, 20 Drawing Sheets

(56) References Cited

U.S. PATENT DOCUMENTS

| | | |
|---|---|---|
| 5,056,073 A | 10/1991 | Fitzgerald et al. |
| 5,067,116 A | 11/1991 | Kadrmas |
| 5,107,475 A * | 4/1992 | Serita ............... G11B 17/0284 369/30.61 |
| 5,123,000 A | 6/1992 | Fitzgerald et al. |
| 5,136,562 A * | 8/1992 | Staar ..................... G11B 17/22 360/98.01 |
| 5,207,727 A | 5/1993 | Pearce et al. |
| 5,236,296 A | 8/1993 | Ostwald |
| 5,242,259 A | 9/1993 | Yeakley |
| 5,253,911 A | 10/1993 | Egan et al. |
| 5,274,620 A | 12/1993 | Sipos |
| 5,289,441 A * | 2/1994 | Domberg ............. G11B 17/225 360/98.06 |
| 5,292,222 A | 3/1994 | Malagrino et al. |
| 5,303,214 A | 4/1994 | Kulakowski et al. |
| 5,335,218 A * | 8/1994 | Osada ................ G11B 17/0283 360/98.04 |
| 5,481,514 A | 1/1996 | Yamasaki et al. |
| 5,528,566 A | 6/1996 | McGee et al. |
| 5,544,148 A * | 8/1996 | Nakamichi ............ G11B 17/30 360/98.07 |
| 5,550,801 A * | 8/1996 | Enomoto ............... G11B 17/28 369/30.61 |
| 5,555,239 A | 9/1996 | Takai et al. |
| 5,586,094 A * | 12/1996 | Pines .................... G11B 17/225 369/30.85 |
| 5,588,796 A | 12/1996 | Ricco |
| 5,610,902 A | 3/1997 | Childers et al. |
| 5,631,785 A | 5/1997 | Dang et al. |
| 5,666,337 A | 9/1997 | Dang et al. |
| 5,684,654 A | 11/1997 | Searle et al. |
| 5,715,230 A * | 2/1998 | Choi .................... G11B 17/225 369/30.55 |
| 5,726,967 A | 3/1998 | Tanaka et al. |
| 5,729,524 A | 3/1998 | Pines |
| 5,734,629 A | 3/1998 | Lee et al. |
| 5,754,519 A * | 5/1998 | Bando .................... G11B 17/28 369/30.85 |
| 5,764,617 A | 6/1998 | Furusawa et al. |
| 5,798,998 A | 8/1998 | Fukushima |
| 5,805,561 A | 9/1998 | Pollard |
| 5,818,802 A | 10/1998 | Menke et al. |
| 5,848,872 A | 12/1998 | Manes et al. |
| 5,923,638 A * | 7/1999 | Watanabe ............... G11B 17/28 720/668 |
| 5,943,306 A * | 8/1999 | Silverstein ............. G11B 17/24 369/30.86 |
| 5,953,293 A | 9/1999 | Kajiyama et al. |
| 5,959,958 A * | 9/1999 | Inatani .................... G11B 17/30 369/30.85 |
| 5,978,323 A | 11/1999 | Nakamura |
| 6,016,291 A | 1/2000 | Joos |
| 6,064,544 A | 5/2000 | Wada |
| 6,084,832 A | 7/2000 | Furusawa et al. |
| 6,097,693 A | 8/2000 | Nakamichi |
| 6,122,231 A | 9/2000 | Watanabe et al. |
| 6,178,153 B1 * | 1/2001 | Cho ..................... G11B 17/225 369/30.55 |
| 6,212,139 B1 * | 4/2001 | Nakamura ............. G11B 17/28 369/30.85 |
| 6,301,218 B1 | 10/2001 | Jones |
| 6,373,796 B1 | 4/2002 | Herring et al. |
| 6,454,509 B1 | 9/2002 | Kappel et al. |
| 6,493,178 B1 | 12/2002 | Brace et al. |
| 6,587,405 B1 | 7/2003 | Klein |
| 6,683,827 B1 | 1/2004 | Omoto et al. |
| 6,731,455 B2 | 5/2004 | Kulakowski et al. |
| 6,802,070 B2 | 10/2004 | Britz et al. |
| 6,826,008 B2 | 11/2004 | Paulat |
| 7,145,841 B1 | 12/2006 | Miller |
| 7,193,810 B2 | 3/2007 | Dickey et al. |
| 7,212,375 B2 | 5/2007 | Dickey |
| 7,234,913 B2 | 6/2007 | Heiland et al. |
| 7,673,309 B2 | 3/2010 | Douglas et al. |
| 7,777,985 B2 | 8/2010 | Arkley |
| 8,041,449 B2 | 10/2011 | Noble |
| 8,042,123 B2 | 10/2011 | Terzis et al. |
| 8,134,799 B1 | 3/2012 | Ostwald |
| 8,276,170 B2 | 9/2012 | Douglass et al. |
| 8,281,327 B2 | 10/2012 | Goto et al. |
| 8,341,653 B2 | 12/2012 | Terzis et al. |
| 8,385,163 B2 | 2/2013 | Goyal et al. |
| 8,528,952 B2 | 9/2013 | Ostwald et al. |
| 8,701,862 B2 | 4/2014 | Takasawa et al. |
| 8,824,250 B2 | 9/2014 | Yoo |
| 8,899,406 B2 | 12/2014 | Nespeca |
| 9,230,591 B2 | 1/2016 | Kinoshita et al. |
| 9,428,336 B2 | 8/2016 | Hagen et al. |
| 9,633,686 B1 * | 4/2017 | Altknecht ............ G11B 17/038 |
| 9,672,863 B1 * | 6/2017 | Altknecht .......... G11B 17/0284 |
| 9,741,389 B1 | 8/2017 | Altknecht et al. |
| 9,741,390 B1 * | 8/2017 | Altknecht ............ G11B 17/225 |
| 9,984,722 B2 | 5/2018 | Altknecht et al. |
| 2002/0044504 A1 | 4/2002 | Kabasawa |
| 2003/0117938 A1 | 6/2003 | Braitberg et al. |
| 2004/0080852 A1 | 4/2004 | Jenkins, Jr. et al. |
| 2005/0007896 A1 | 1/2005 | Haas |
| 2006/0005209 A1 | 1/2006 | Hiang |
| 2006/0021896 A1 | 2/2006 | Cleathero et al. |
| 2006/0136950 A1 | 6/2006 | Eberdorfer |
| 2007/0127323 A1 | 6/2007 | Owens |
| 2010/0287576 A1 * | 11/2010 | Terzis .................... G11B 17/28 720/630 |
| 2012/0117578 A1 * | 5/2012 | Goyal .................. G11B 17/221 720/615 |
| 2013/0256164 A1 | 10/2013 | Haggard |
| 2014/0126340 A1 * | 5/2014 | Yoo ...................... G11B 17/225 369/30.06 |
| 2014/0301813 A1 * | 10/2014 | Kinoshita ............... G11B 17/22 414/281 |
| 2017/0232619 A1 | 8/2017 | Altknecht et al. |
| 2018/0211691 A1 | 7/2018 | Altknecht et al. |

FOREIGN PATENT DOCUMENTS

| | | |
|---|---|---|
| EP | 0924698 A2 | 6/1999 |
| EP | 1653461 A2 | 3/2006 |
| WO | 2010005624 A1 | 1/2010 |
| WO | 2014076978 A1 | 5/2014 |

OTHER PUBLICATIONS

Watanabe, A. et al., "Optical library system for Long-term preservation with extended error correction coding", Proceedings of the IEEE Symposium on Massive Storage Systems and Technologies, 2013, pp. 1-18, IEEE Computer Society, United States.

International Search Report and Written Opinion dated Apr. 28, 2017 for International Application No. PCT/IB2017/0505592, pp. 1-12, State Intellectual Property Office of the P.R. China, Beijing, China.

* cited by examiner

ACTUATOR TIP CALIBRATION FOR ROBOTIC OPTICAL STORAGE SYSTEM

BACKGROUND

Conventional optical libraries have low performance, with access times of 10 s of seconds to a minute or more. While optical drives allow fast random access to data on a disc, the overall random access performance is limited by the media move time and drive initialization times.

SUMMARY

Embodiments relate to robotic device calibration in optical storage systems. In one embodiment, a calibration system includes a moveable arm configured for movement within an optical disc storage system. A disc kicker device includes an actuator and an actuator tip that contacts an optical disc. The disc kicker device is connected to the moveable arm. The calibration system performs a calibration operation to calibrate the actuator at the actuator tip to correct displacement error.

These and other features, aspects and advantages of the embodiments will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more embodiments provide for calibration in a robotic optical storage disc system. One embodiment includes a calibration system including a moveable arm configured for movement within an optical disc storage system. A disc kicker device includes an actuator and an actuator tip that contacts an optical disc. The disc kicker device is connected to the moveable arm. The calibration system performs a calibration operation to calibrate the actuator at the actuator tip to correct displacement error.

Figure 1:
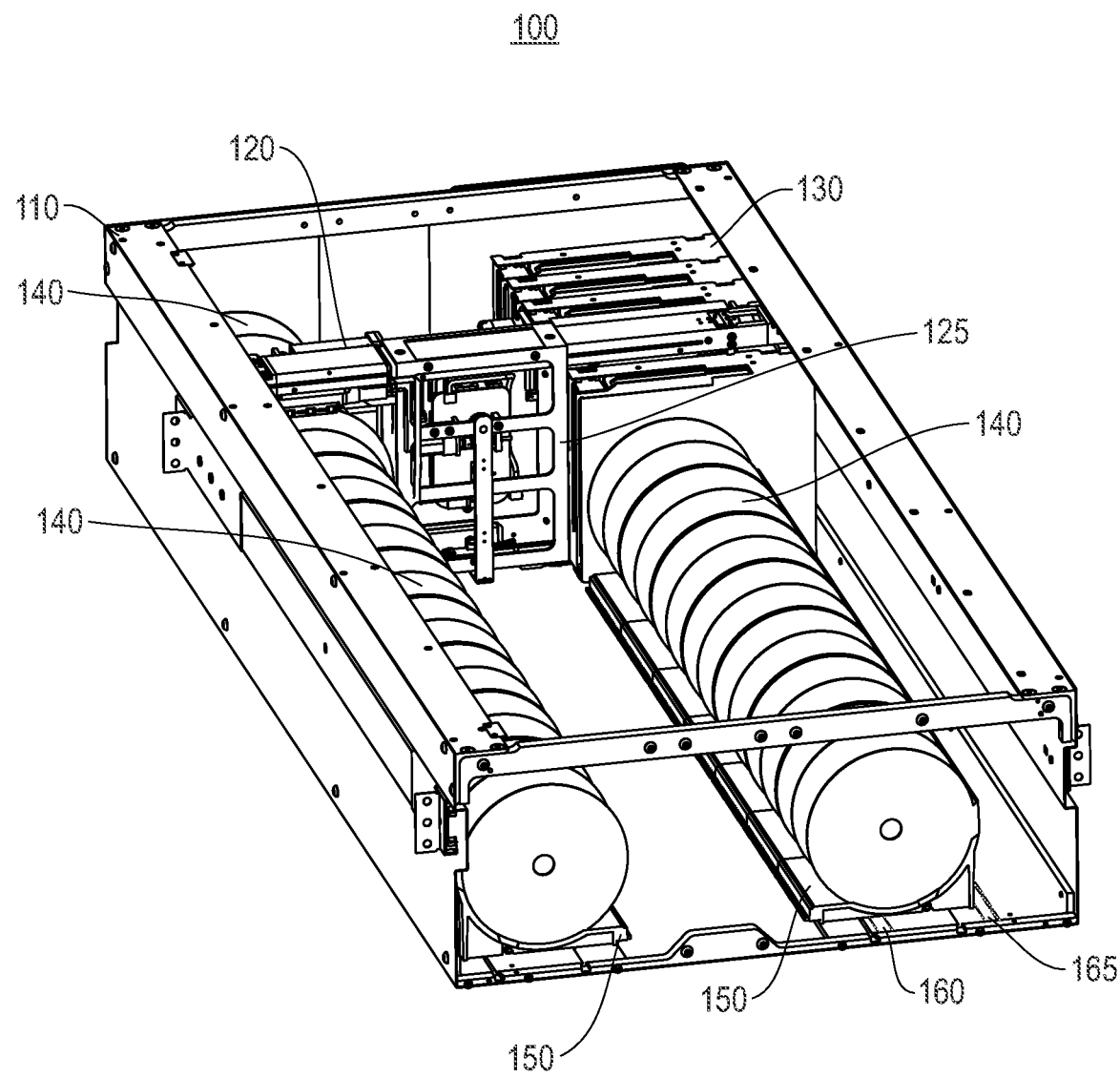
FIG. 1 is a high performance optical storage system, according to an embodiment.

FIG. 1 is a high performance optical storage system 100, according to an embodiment. In one embodiment, the high performance optical storage system 100 includes an enclosure 110, a moveable arm 120 connected to a disc retrieval unit (DRU) 125, multiple optical disc drives 130, multiple optical disc-based media (discs) 140, disc cassettes 150, and tracks 160 and 165 that hold the disc cassettes 150 in place. In one embodiment, the enclosure 110 provides a stable platform and protection from the environment. In one example, the enclosure includes filter material connected to cooling fans (not shown) and a top enclosure (not shown for internal viewing). In one embodiment, the enclosure may be sized as a typical 19 inch rack mounted device with rack mounting connectors. Depending on the space and enclosure size chosen, the enclosure 110 may have a greater capacity of optical disc drives 130, disc cassettes 150, and thus, discs 140. In one example, the disc cassettes 150 are placed within the enclosure 110 on either side (e.g., left and right sides) of the enclosure 110. In one example, additional disc cassettes 150 and discs 140 space is available adjacent the disc drives 130 (e.g., towards the front of the enclosure 110). In wider enclosures 110, more disc drives 130 may be positioned adjacent each other on the left and right side of the enclosure 110 when more available space for disc drives 130 is available. In one embodiment, the moveable arm 120 moves through motors and gears on tracks within the enclosure 110 to move the DRU 125 from the back of the enclosure 110 to the front of the enclosure 110. The DRU 125 is moveable to either side of the enclosure 110 to retrieve a disc 140 for placement in a disc drive 130 or for replacement back to a disc cassette 150. The components of the high performance optical storage system are described in further detail below.

Figure 2:
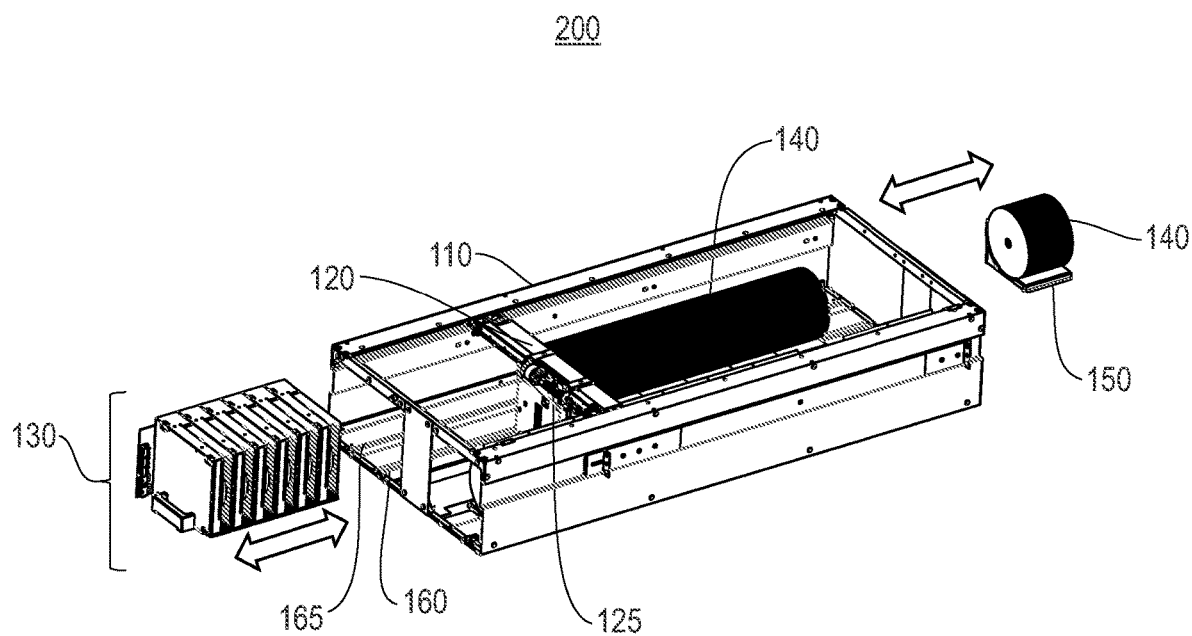
FIG. 2 shows entry/removal of disc cassettes with optical discs and optical disc drives into/out from an example rack enclosure, according to an embodiment.

FIG. 2 shows entry/removal of disc cassettes 150 with discs 140 and disc drives 130 into/out from an example rack enclosure 110, according to an embodiment. In one embodiment, the disc drives 130 are commonly mounted to a carrier assembly such that they can be easily removed from one end of the enclosure 110 for maintenance. This way, the set of disc drives 130 may plug into a backplane in the carrier. The disc cassettes 150 are modular units that hold many optical discs 140 (e.g., 50 discs, etc.) and may be removed through an end of the enclosure 110. In one example, the disc drives 130 are all positioned on one side of the enclosure 110. This allows all the disc drives 130 to be mounted in a single carrier and still allow a central support at the end of the enclosure 110. In one example, the enclosure 110 may have different disc cassette 150 capacities on either side of the enclosure 110. Using cassette 150 assemblies as shown allows for a single part to be utilized on both sides of the enclosure 110 to create different storage capacities as desired.

Figure 3:
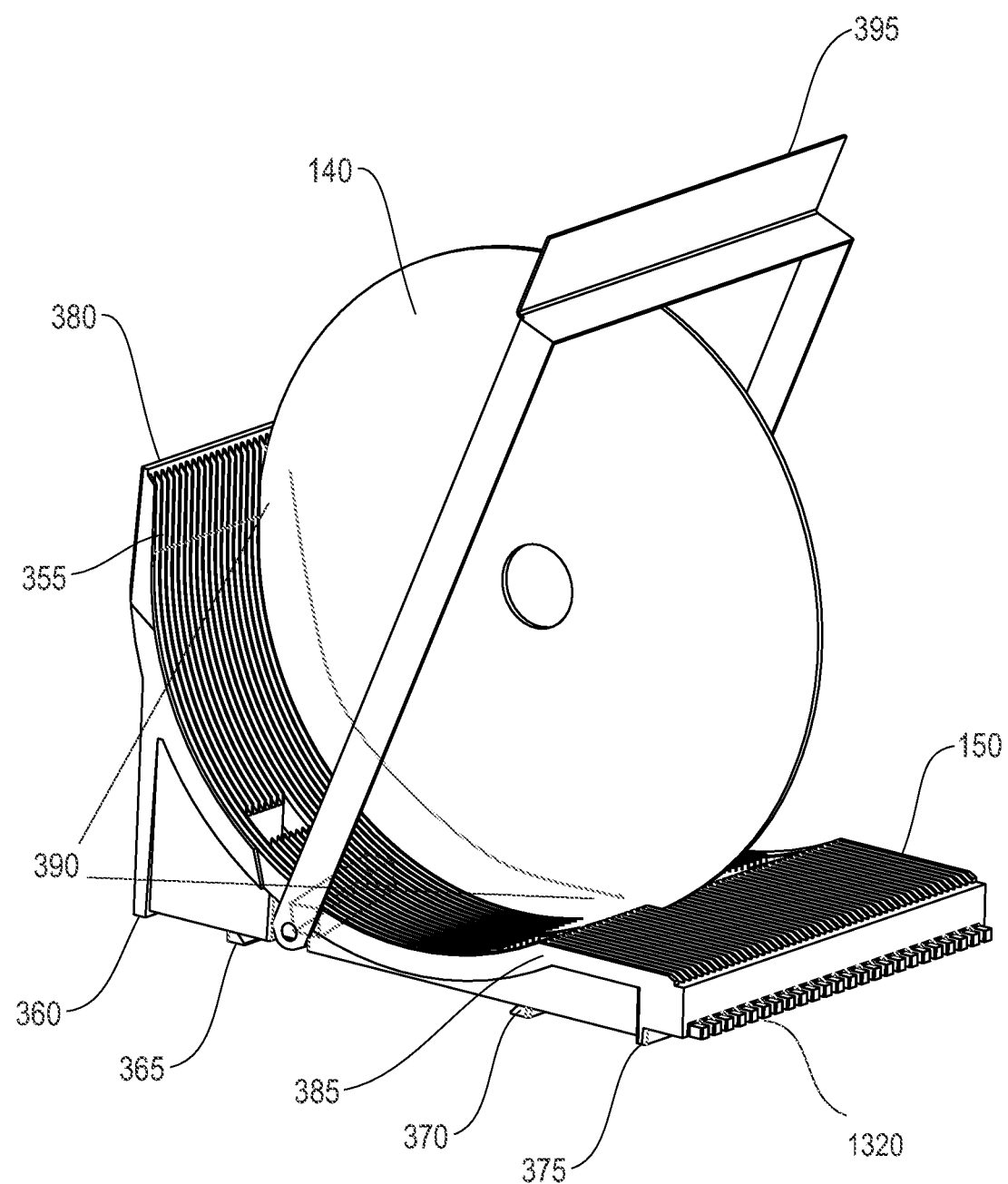
FIG. 3 is an example disc cassette for holding and retrieval of optical discs, according to an embodiment.

FIG. 3 is an example disc cassette 150 for holding/storing and retrieval of optical discs 140, according to an embodiment. In one embodiment, the discs 140 are contained in the disc cassettes 150 within a slot (or channel, groove, etc.) 355. The disc cassettes 150 hold the discs coaxially in a vertical orientation. The discs 140 are spaced very tightly, for example 1.82 mm apart. Thin ribs (e.g., 0.4 mm) form the slot 355, separate the discs 140 and provide guidance when removing a disc 140 from a particular location or returning it to the disc cassette 150. In one embodiment, the ribs are designed to limit lateral contact with a disc 140 surface to that portion of the outer edge, which is free of data (i.e., does not contain data). The cassette has features that allow the DRU 125 (FIG. 1) to be positioned to within +/−0.1 mm so a disc selector or kicker device 420 (FIGS. 4A-F) can lift one disc 140 into a disc gripper device 410 without disturbing adjacent discs 140. The disc cassette has additional features or track connectors (or pair of extensions) 360, 365 and 370, 375 that position it with respect to a mounting track 160/165 (FIG. 1) on the enclosure 110 bottom portion. In one embodiment, the track connectors 365 and 370 have a "dove tail" feature that fits within the track portions 165 and 160, respectively. In one example, the track connectors are spring-like or flexible for gripping the mounting tracks 160/165. The example disc cassette 150 also includes fiducial (optical) nubs 1320 (see also, FIGS. 13-15).

In one embodiment, the disc cassette 150 contacts the outer rim of the disc 140 over an angle spanning substantially less than 180 degrees (see lines 390) when the disc is at home in a disc cassette 150. The cassette has a shorter inner lip 385 to the center of the enclosure 110 (FIG. 1), and a taller lip 380 at the outside of the enclosure 110. As described, a combination of gravity and friction hold the discs 140 in place. To provide further protection against shock, an optional disc retainer bale 395 may be employed limiting the motion of the discs 140 when not being accessed. In one example, the disc retainer bale 395 is be moved out of the way (e.g., by the disc gripper device 410 (FIGS. 4A-F) when accessing a disc 140. In one embodiment, the disc cassette 150 includes an optional disc retainer bale 395. In one example, the disc retainer bale 395 is spring-loaded.

Figure 4A:
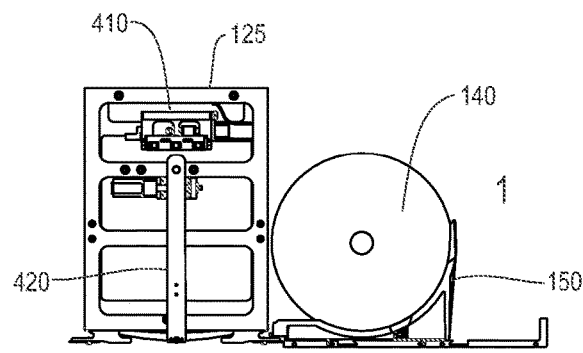
FIGS. 4A-F show retrieval of an optical disc from the cassette shown in FIG. 3 by the disc retrieval unit (DRU) including a kicker device and disc gripper device, according to an embodiment.
Figure 4D:
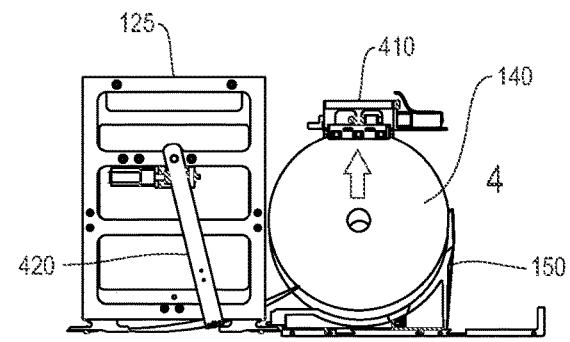
Figure 4B:
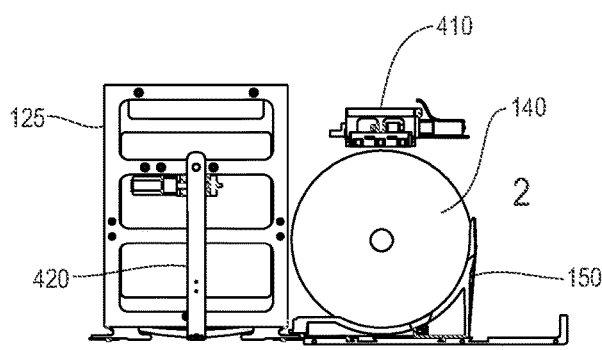

FIGS. 4A-F show retrieval of an optical disc 140 from the disc cassette 150 shown in FIG. 3 by the DRU 125 including a kicker device 420 and disc gripper device 410, according to an embodiment. In one embodiment, the disc cassette 150 is designed to provide disc 140 access motions in both the vertical and horizontal directions as show in FIGS. 4A-F. That is, the disc 140 is lifted above the inner lip 385 (FIG. 3) and then translated to the center of the enclosure 110 within the DRU 125. In FIG. 4A, the DRU 125 is positioned by the robotics for alignment across from the selected disc 140. In FIG. 4B, the disc gripper device 410 is moved laterally from the center of the DRU 125 to a position vertically above the selected disc 140. If there is a restraint mechanism on the cassette (e.g., disc retainer bale 395 (FIG. 3)), it is moved out of the way by the disc gripper device 410.

Figure 4E:
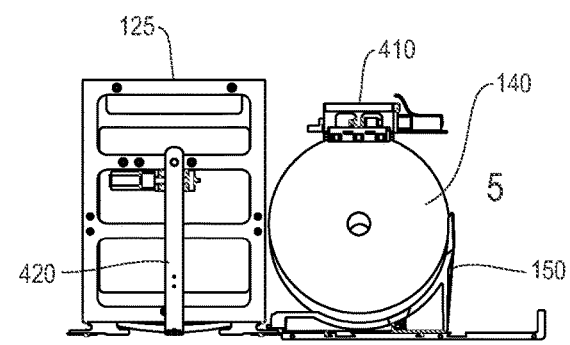
Figure 4C:
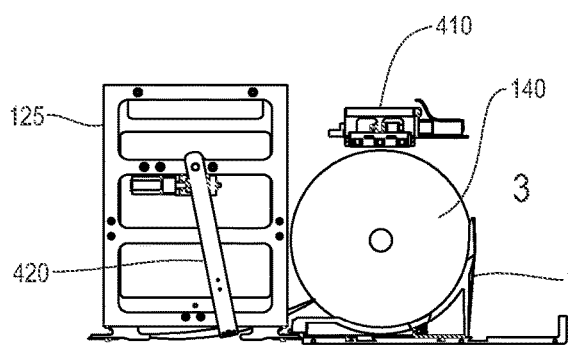
Figure 4F:
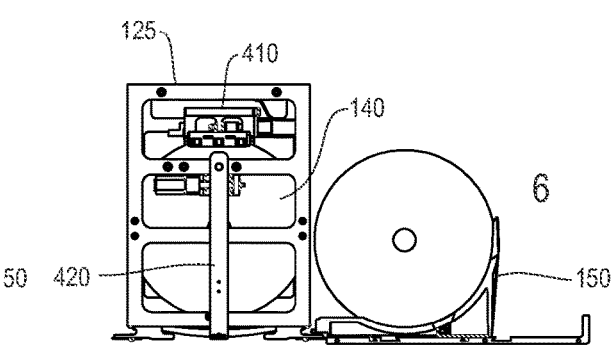

In FIG. 4C the disc kicker device 420 is rotated by the robotic controller of the DRU 125 until it contacts the edge of the disc 140. In FIG. 4D the disc kicker device 420 is further rotated by the robotic controller remaining in contact with edge of the disc 140. The shape of the disc cassette 150 constrains the disc 140 to move it vertically by lifting the disc 140 into the disc gripper device 410. During this operation, the edge of the disc 140 near the outside of the enclosure 110 is constrained against out-of-plane motion by the slot 355 (FIG. 3) in the disc cassette 150. Once the disc 140 has reached its vertical limit, the disc gripper device 410 closes jaws 415 (FIG. 5) on both surfaces of the disc 140 in the edge region, securely holding the disc 140. In FIG. 4E the disc kicker device 420 is retracted by the robotic controller of the DRU 125 to the central position. In FIG. 4F the disc gripper device 410 is returned to the central position within the DRU 125, moving the disc 140 into the travel position. In one example, the angle of contact subtended by the disc cassette 150 must be limited to allow for this motion of the disc 140. Further, extending of the walls of the slot 355 above the storage contact point of the disc 140 provides a vital out of plane motion restraint for the disc 140. The slot 355 further operates as a guide when a disc 140 is returned to the disc cassette 150.

In one embodiment, the slot 355 pitch is slightly larger than the thickness of a disc 140. Tighter spacing allow for more discs 140 to fit in the enclosure 110. This spacing is limited by the disc cassette 150 materials to maintain the disc 140 orientation. The disc cassette is preferably made by injection molding. However, other molding techniques may also be employed. In one example, the disc cassette 150 includes "dove tails" on the track connectors 365 and 370 disposed along the bottom to facilitate position registration and to securely hold the disc cassettes 150 in place, while allowing for the cassettes to be inserted and extracted from the enclosure 110 by sliding out an end of the enclosure 110.

Figure 5:
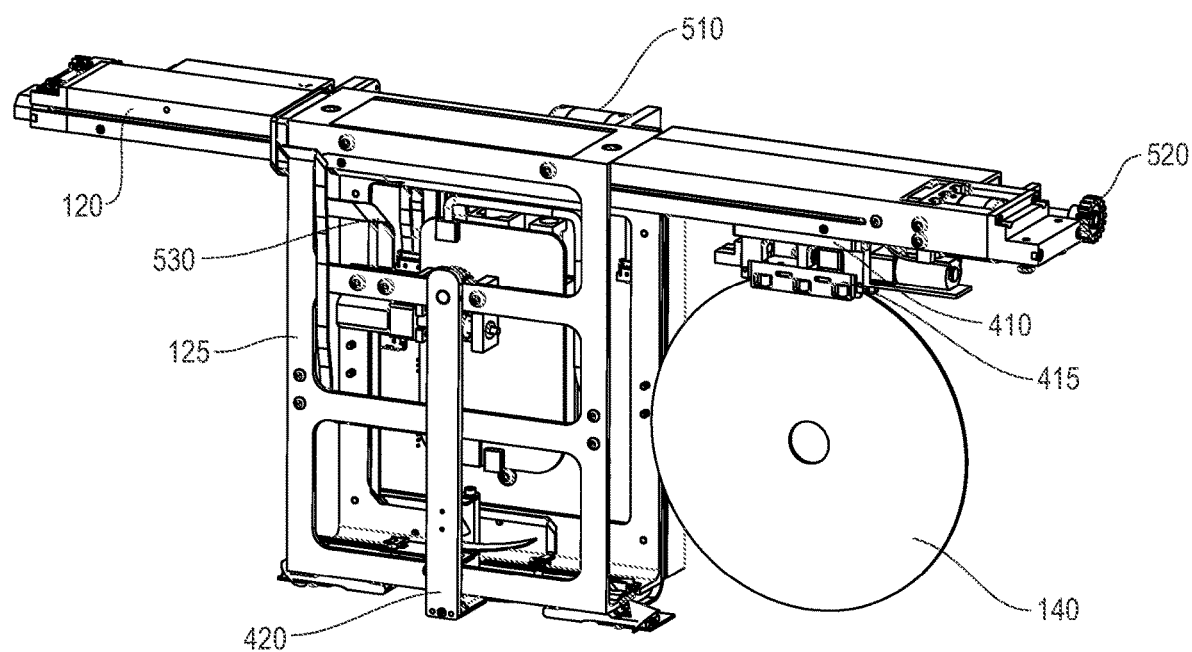
FIG. 5 is an isolated view of the DRU and an optical disc being held by the disc gripper device, according to an embodiment.

FIG. 5 is an isolated view of the DRU 125 and an optical disc 140 being held by the jaws 415 of the disc gripper device 410, according to an embodiment. In one embodiment, the DRU 125 is configured in a "T" configuration, with a crossbar or arm 120 that travels above the discs 140 and has a central portion attached beneath the arm 120. The arm 120 moves longitudinally along the center of the enclosure 110, driven by a motor 510 that travels with the arm 120. In one example, the motor 510 drives the arm 120 via pinion attachments 520 on both ends of the arm 120 that engage racks on both sides of the enclosure 110. In one example, the DRU 125 is supported on bearings at either end of the arm 120. The mechanical arrangement thus drives both ends in concert along the racks of the enclosure 110. This arrangement prevents the DRU 125 from binding due to bearing friction. It also aids in keeping the DRU 125 rigid and limits twisting motion, which allows for tight tolerances on the disc 140 spacing. In one example, the DRU 125 includes a wiring control connector 530 that communicate control commands to the controlling circuitry of the DRU 125.

Figure 6:
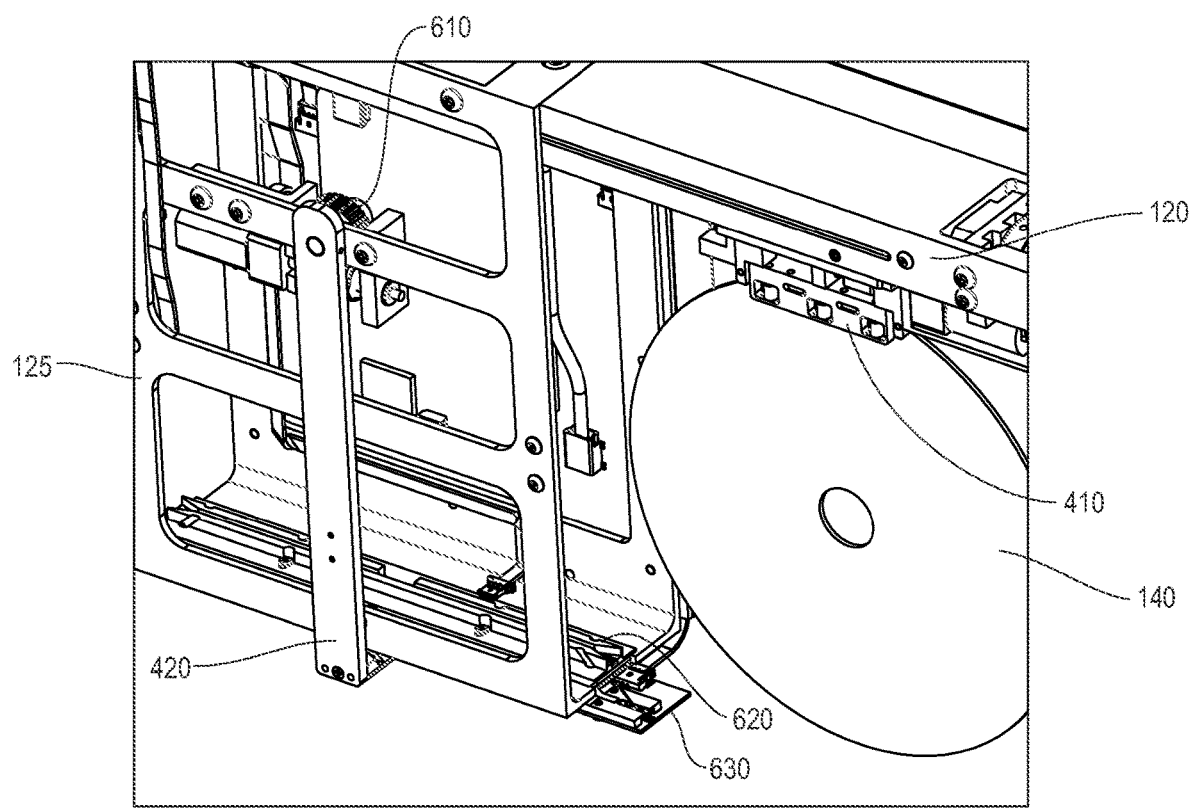
FIG. 6 is a close-up view of a disc carrier portion of the DRU and an optical disc being gripped by the disc gripper device, according to an embodiment.

FIG. 6 is a close-up view of a disc carrier portion of the DRU 125 and a disc 140 being gripped by the disc gripper device 410, according to an embodiment. In one embodiment, the DRU 125 includes the disc gripper device 410, which holds the disc 140 by both surfaces in the edge region. The disc gripper device 410 travels laterally on the arm 120, such that it can be positioned over discs 140 on either side of the enclosure 110 (FIG. 1), in the center for travel, and at the dropoff/pickup positions at the disc drives 130. The central portion of the DRU 125, which is a disc carrier including the disc kicker device 420 that lifts the discs 140 out of the disc cassette 150 using a motor 610, control electronics, sensors 630, and a disc guide (groove or slot) 620. The disc guide 620 constrains the bottom edge of the disc 140 when the disc gripper device 410 is positioned in the carrier. This keeps the disc 140 stable during high speed accelerations and from windage during high speed motion of the arm 120, allowing the DRU 125 to move a disc 140 from one end of the enclosure 110 to the other in under 1 second.

In one embodiment, the disc guide 620 has a capture region at either side to provide tolerance for deviations of the disc 140 orientation from perfectly vertical when moving the disc 140 into the carrier. In one example, a further aspect of the disc guide 620 is that it also acts as a guide for the disc kicker device 420, keeping the disc 140 and disc kicker device 420 properly registered to each other.

In one embodiment, the DRU 125 does not require a traveling lateral power connection (Flex cable, wire harness, etc.) to function. In one example, the DRU 125 is designed such that power is only required at discrete lateral positions of the disc gripper device 410. These discrete lateral positions are located at the left and right dropoff/pickup positions. Power is provided here by contacts, such as pushpins, that the laterally moving portion comes into contact with at the stated positions. This operation is facilitated by the disc gripper device 410 being powered only to perform grip or un-grip operations. No power is required when holding a disc 140.

In one embodiment, the disc 140 media may be single sided or dual sided. The disc drives 130 (FIG. 1) may have single sided or dual sided capable. It may be that single side disc drives 130 are used in combination with dual side media. In such a case, in one embodiment the DRU 125 may include a mechanism to flip the disc 140 about a vertical axis to orient the desired side of the media for drive operations. In one example, the flip operation may occur while transporting the media, thus has limited or no impact on performance. In another example, a separate mechanism flips the discs 140. In this example, the DRU 125 delivers a disc 140 to the flipper and retrieves it after it has been flipped. Another example includes orienting a subset of the disc drives 130 for operating on one side of the discs 140, and the remaining drives for operating on the other side of the discs 140. This avoids the need to perform a flip operation.

Figure 7:
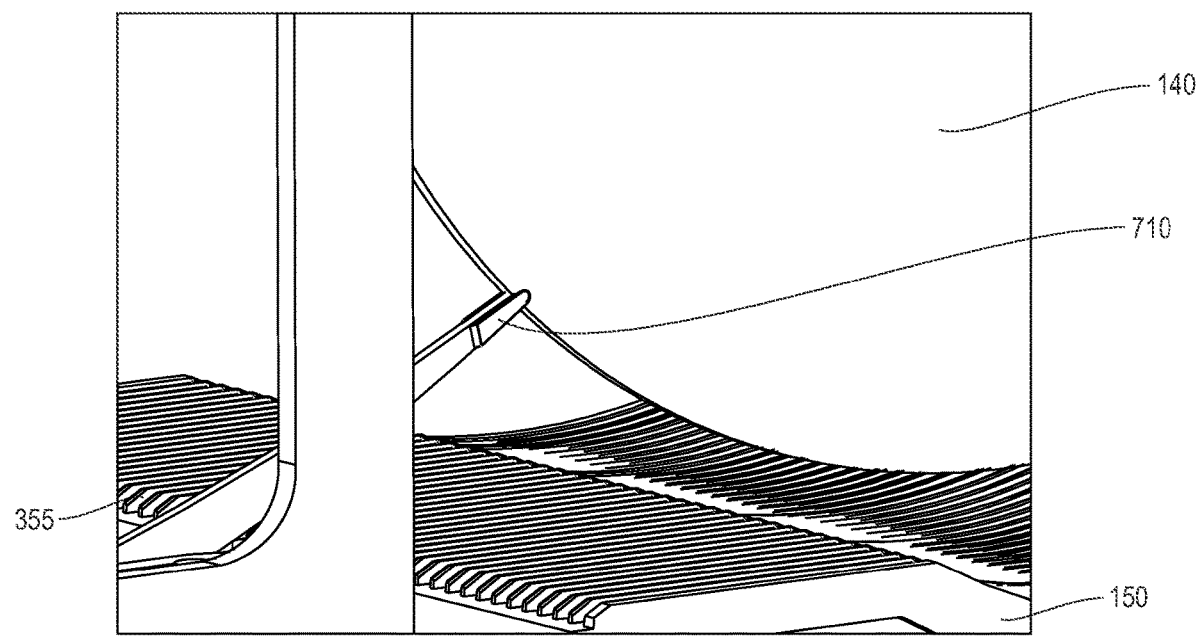
FIG. 7 is a close-up view of a kicker tip of the DRU, according to an embodiment.
Figure 8A:
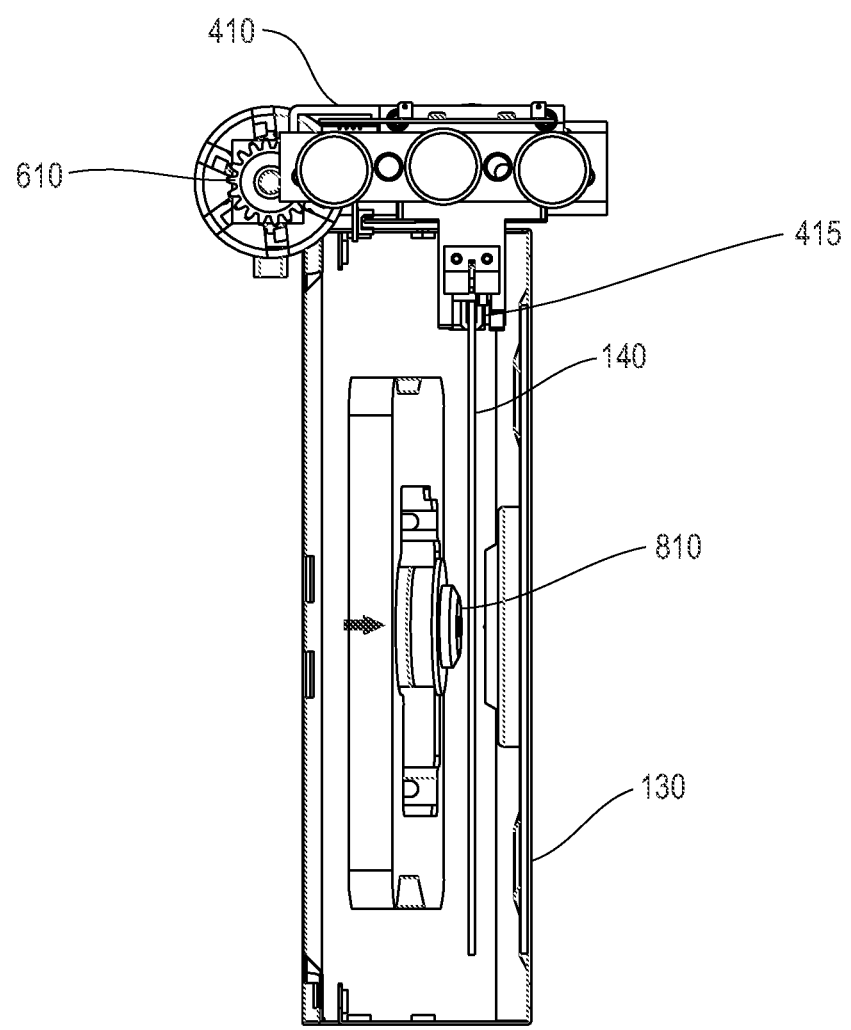
FIGS. 8A-E show progression for loading of an optical disc into a disc drive from the DRU, according to an embodiment.
Figure 8B:
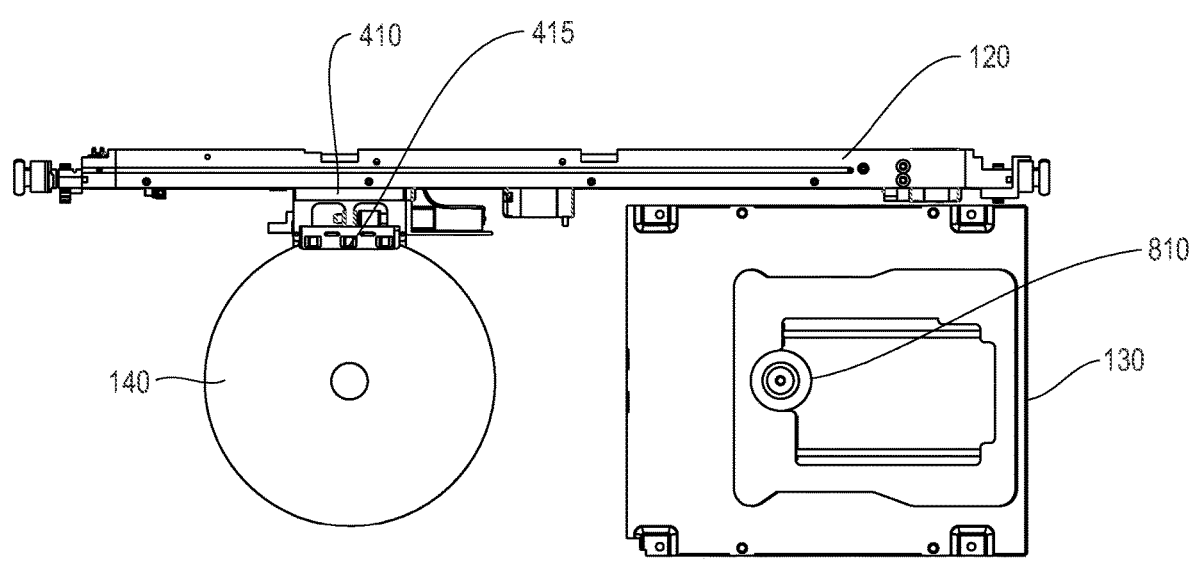
Figure 8C:
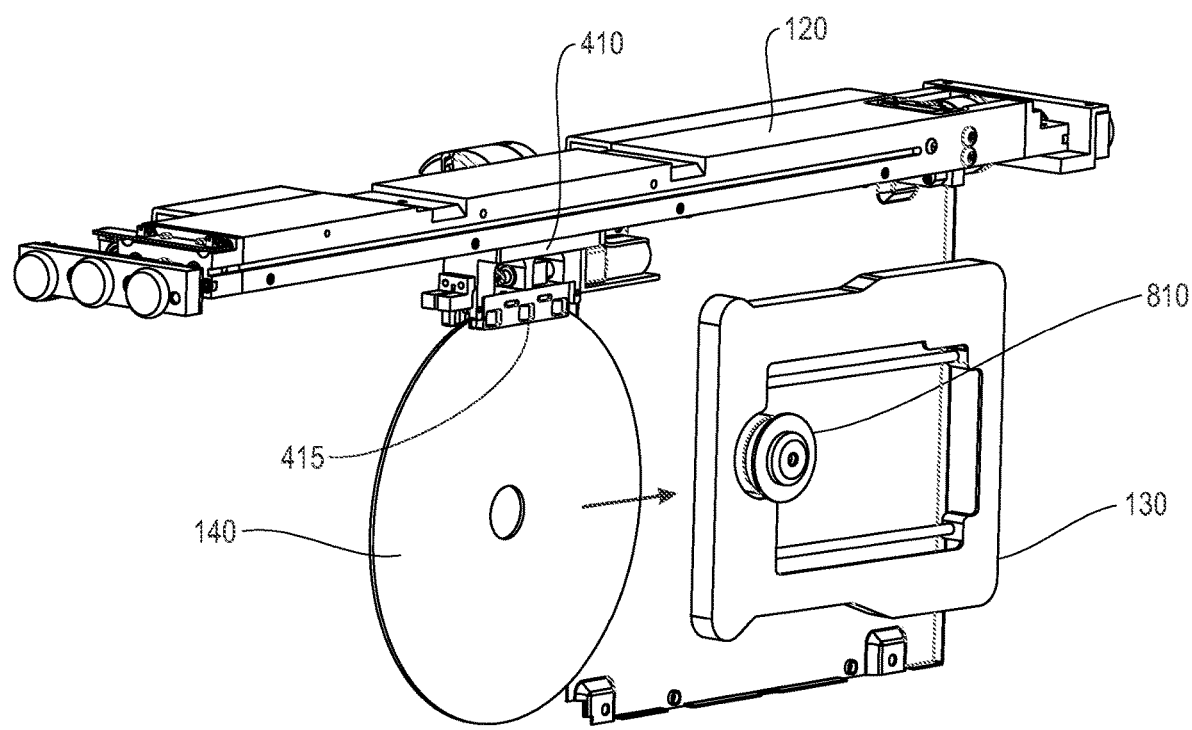
Figure 8D:
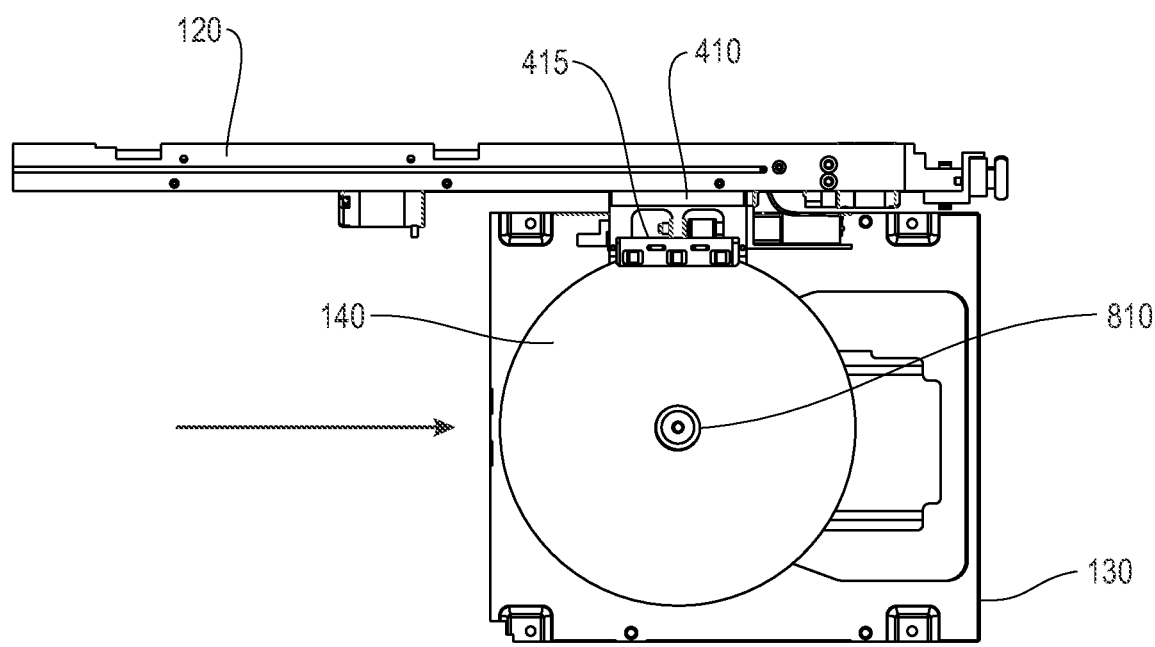
Figure 8E:
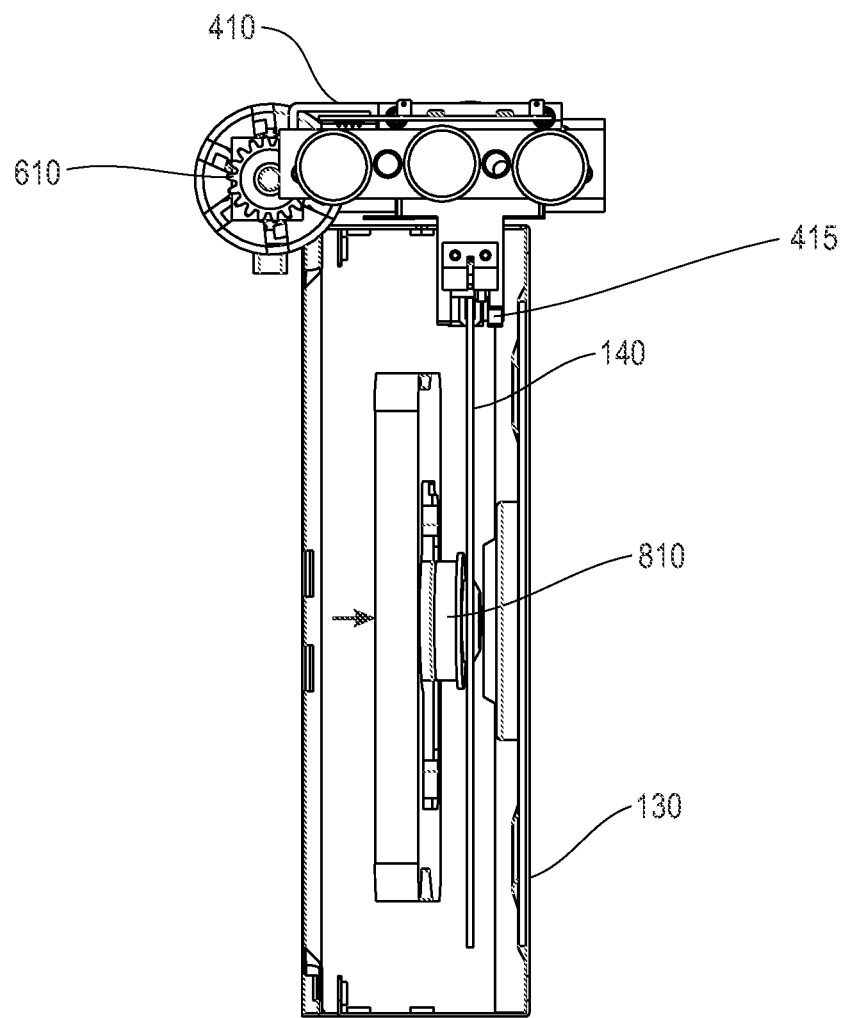

FIG. 7 is a close-up view of a kicker tip 710 for the disc kicker device 420 (see, e.g., FIGS. 4A-F) of the DRU 125, according to an embodiment. In one embodiment, 1.2 mm thick discs 140 are packed on 1.82 mm centers in the disc cassette 150, leaving 0.62 mm between discs 140. A disc 140 must be rapidly selected from the disc cassette 140, secured by the disc gripper device 410 (FIGS. 4A-F), and moved onto the DRU 125 (FIG. 1) for transport to a disc drive 130 without disturbing or damaging adjacent discs 140. In one example, discs 140 must also be returned to their slots 355 after the requested data has been read.

In one embodiment, a motor 610 (FIG. 6) actuated disc kicker device 420 on the disc carrier of the DRU 125 is swung back and forth to contact discs 140 on either side of the enclosure 110 (FIG. 1). A tip 710 of the disc kicker device 420 aligned with one of the discs 140 contacts the disc edge and, with the disc 140 back edge guided by fins in the back wall of the disc cassette 150, lifts the disc 140 vertically into the disc gripper device 410 jaws 415 (FIG. 5) or lowers it out of the disc gripper device 410 back into the disc cassette 150. In one embodiment, the tip 710 of the disc kicker device 420 blade are somewhat wider than the disc 140 and are shaped to capture the disc 140 edge, thus preventing the disc 140 from slipping off the tip 710. In other example, blade tips 710 with a concave contour or a shallow trapezoidal groove may be employed to fulfill this objective.

FIGS. 8A-E show progression for loading of an optical disc 140 into a disc drive 130 from the DRU 125 (FIG. 1), according to an embodiment. The disc gripper device 410 is designed to securely hold a disc 140 using the jaws 415 with sufficient force to allow rapid acceleration without the disc 140 slipping, and to enable rapid gripping and releasing of the disc 140. The disc 140 surface must not be damaged during these operations. A further aspect of the disc gripper device 410 is that it must not drop a disc 140 on power loss, thus power is required only to transition between gripped and un-gripped states. In one embodiment, the disc gripper device 410 jaws 415 are shaped so as to contact only the non-data portion of the outer diameter of a disc 140. This may be facilitated by gripping the disc 140 edge over an angle of about 35 degrees.

In one embodiment, the disc gripper device 410 is mounted on a high speed translation mechanism on the arm 120, such as a lead screw. The disc gripper device 410 can translate laterally such that it can access discs 140 on both sides of the enclosure 110 (FIG. 1), and to the disc mount position in the disc drives 130. In one example, the disc gripper device 410 mechanism may be provided with a stage for rotating the disc 140 about a vertical axis to allow the use of double-sided media with single-sided disc drives 130. In another example, a second disc gripper device (not shown) is positioned with rotation capability at fixed location in the enclosure 110. The disc 140 is delivered to the second disc gripper device, and the first disc gripper releases the disc 140 and moves away. The second disc gripper device rotates the disc through 180 degrees, and then the first disc gripper device (e.g., disc gripper device 410) returns and retrieves the disc 140 from the second disc gripper device. The second disc gripper device may be positioned on the bottom of the enclosure 110 and rotate the disc 140 about a vertical axis, or it may be mounted to a side of the enclosure 110 and rotate the disc 140 about a horizontal axis. To facilitate throughput, the DRU 125 may move a second disc 140 between the storage area and the disc drives 130 while the first disc 140 is being flipped.

In one embodiment, direct robotic delivery and pickup of media to and from a mount position at the optical drive spindle 810 is implemented. The mount position is defined as where the center of the optical disc is displaced in the plane of the disc from the center of the spindle by less than an inner diameter of the optical disc. This differs from conventional designs, where the disc is delivered to a tray or slot load optical drive. Direct load improves the round trip time for a disc 140 by about 4 seconds, as it avoids the roughly a 2 second tray/slot load and unload times. A further advantage is that both tray and slot load mechanisms are subject to mechanical breakdown, limiting the drive lifetime in terms of load/unload cycles. One or more embodiments avoid such wear-out mechanisms. A further advantage is that high density disc packing requires tight tolerance in the disc retrieval from the disc drive 130. Tray and slot loaders have significant slop in the position of the disc when presented for pickup. In one example, a disc drive 130 includes a modified conventional disc drive that is customized to provide direct access operations. An opening is provided in the drive case to allow the disc gripper device 410 to move to the spindle 810 mount position. The jaws 415 of the disc gripper device 410 use a clamping mechanism to secure the disc 140 after the disc 140 is unclamped from the spindle 810.

In one embodiment, the hub mechanism of the disc drive 130 is shock mounted, and this provides sufficient tolerance to allow the disc gripper device 410 to securely grip a disc 140 over a range of mounted disc positions, and to allow the spindle clamp to grip a disc 140 being delivered over a range of positions. The compliance provided by the hub mechanism shock mounting allows the disc gripper device 410 to be positioned such that there is a slight vertical interference between the top of the disc 140 and a disc sense mechanism of the disc gripper 410 when it is in its limiting "disc present" position. This ensures that the disc 140 will have a vertical net force against a disc sense mechanism in its limit position when the disc gripper device 410 is actuated at the disc drive 130. In one example, the implementation of the direct access customized disc drive 130 provides for mounting/unmounting of a disc 140 to be accomplished in about 1 second.

In one embodiment, to mount a disc 140 in the disc drive 130, the DRU 125 moves to the longitudinal position for dropoff at the chosen disc drive 130 within the enclosure 110. The disc gripper device 410 then translates laterally to the mount position, and holds the disc 140 until the clamp mechanism has secured the disc 140 on the spindle 810. In one example, the disc gripper 410 releases the disc 140 and retreats back to a centered position of the DRU 125. Similarly, the disc 140 may be retrieved from the disc drive 130 by securely gripping the disc 140 by the jaws 415 of the disc gripper device 410 while it is held on the optical drive spindle 810 (after it has stopped rotating and before the disc drive 130 clamp has released it) so that the disc 140 is always under positive control. In another embodiment, it is beneficial for the disc drive 130 to include constraints, which allow the spindle 810 clamp to fail safe. This means that if the spindle 810 clamp releases the disc 140 inadvertently, the disc 140 can either be re-clamped by the spindle 810, or delivered to the disc gripper device 410. During load, the disc gripper device 410 could release prior to the spindle 810 clamp being engaged, and during pickup the spindle 810 clamp can release before the gripper 410 engages.

In one embodiment, the disc drives 130 are positioned such that the lateral disc dropoff/pickup position of the disc gripper device 410 at the disc drives 130 differs only slightly (<1 cm) from the lateral position for disc dropoff/pickup in the disc cassette 150 (FIGS. 4A-F) on the same side of the enclosure 110 (FIG. 1) as the disc drives 130. The disc drive 130 is vertically positioned such that the disc drive 130 mount position aligns with a disc 140 in the disc gripper device 410. In one example, a shadow mask is incorporated at the bottom edge of the disk drive 130 that allows the DRU 125 to be longitudinally positioned to within +−0.1 mm.

In one embodiment, a further aspect includes the use of optical disc drives 130 with high speed initialization features. Such a disc drive 130 significantly reduces the time from disc 140 load to first byte of data. In standard disc drives, this operation can take 10 s of seconds as the drive performs operations such as identifying the media type, reading bad block tables or other initialization data off the media, etc. In one embodiment, an inventory manager (described below) is implemented that stores and transmits initialization information to the disc drive 130 on media load, eliminating the time required by the disc drive 130 to read this information from the disc 140. This reduces the initialization time to around 1 second.

Figure 9:
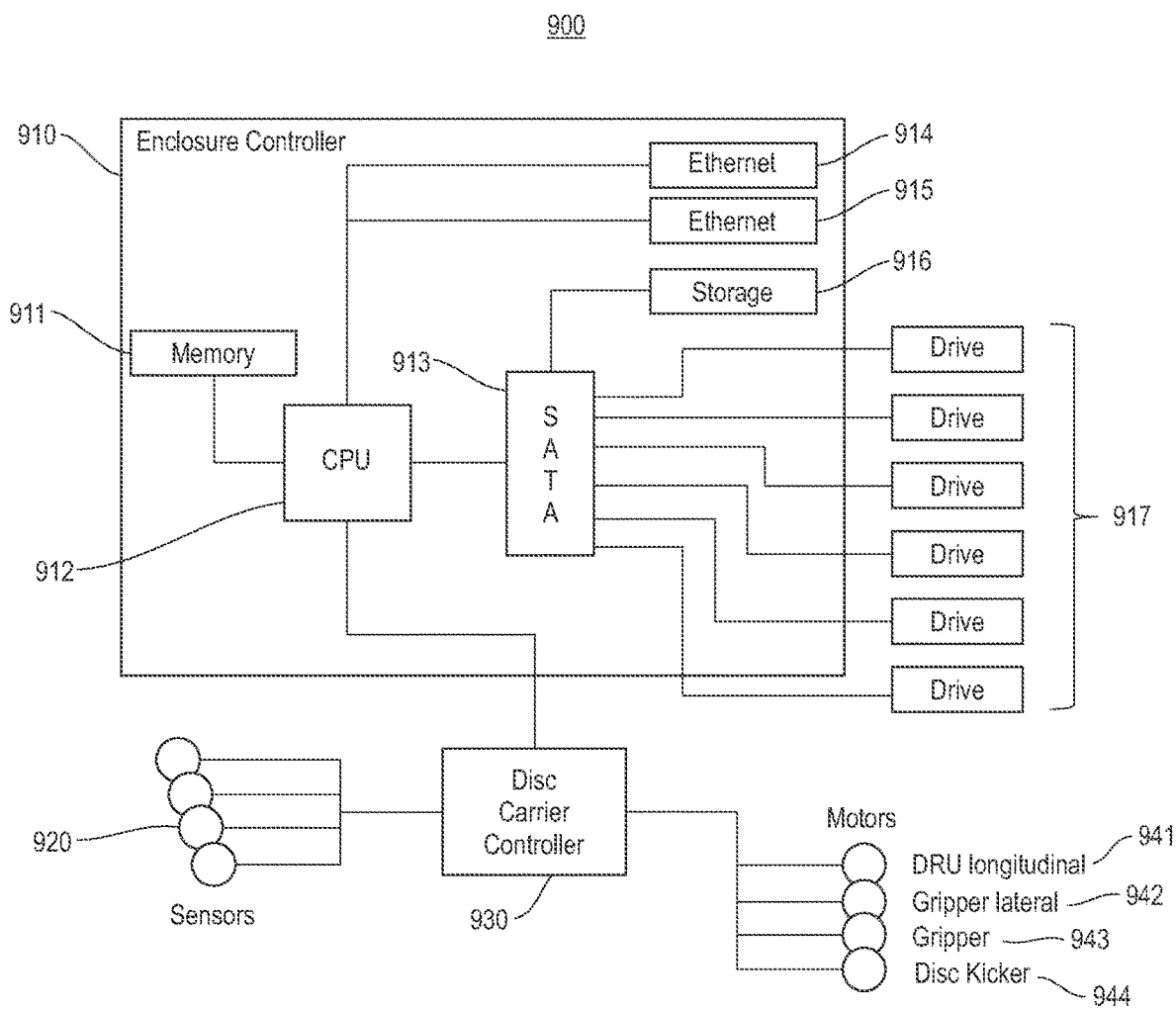
FIG. 9 shows control circuitry and electronics for the high performance optical storage system, according to an embodiment.

FIG. 9 shows control circuitry and electronics 900 for the high performance optical storage system 100 (FIG. 1), according to an embodiment. In one embodiment, optical sensors of the sensor set 920 are used in the system to provide contactless position information for various moving components. In one example, optical sensors of the sensor set 920 on the disc carrier of the DRU 125 combined with the features of the disc cassettes 150 and the disc drives 130 allow the disc gripper device 410 to be positioned to within +−0.1 mm. Other sensors of the sensor set 920 are used to sense location of the disc kicker device 420, whether a disc 140 is in the disc gripper device 410, the lateral position of the disc gripper device 410, etc. Sensors of the sensor set 920 may be used in concert with features on the disc cassettes 150 to facilitate positioning of the DRU 125 at disc 140 locations. Other examples include referring to the discs 140 themselves. Similarly, features may be disposed on the enclosure 110 or the disc drives 130 to facilitate accurate positioning of the DRU 125 when loading and unloading discs 140 from the disc drives 130. In another example, transmissive photo interrupter sensors may be utilized for position state sensing of the various components. The motors used in the system may be of the brushless DC type, optionally with shaft encoders to aid in position determination. In one example, the motors may include the DRU 125 longitudinal motor(s) 941, the disc gripper device 410 lateral motor(s) 942, the disc gripper device 410 motor 943, the disc kicker device 420 motor(s) 944, etc.

In one embodiment, the control electronics shown in the control circuitry and electronics 900 are partitioned into a robotic controller (the disc carrier controller 930) on the disc carrier and an enclosure controller 910 otherwise mounted in the enclosure 110 (FIG. 1). The latter does not move, and includes a CPU 912, memory 911 and associated components for running the control software. In one example, the control circuitry and electronics 900 includes local storage for holding the operating system and the control software, although in another example may instead boot over a network and load the necessary software, or even boot off the optical media of a disc 140. In another example, flash memory storage is implemented. The enclosure controller 910 includes both the external interface to a host system or network as well as interfaces (SATA 913, storage interface 916) to the disc drives 130, collectively shown as a set 917. In one example, the external interface may include a network interface, such as Ethernet. In one embodiment, for enhanced reliability, the network interface would include two connections, such as Ethernet connections 914 and 915 with each directed to a separate switch. In another example, a third external interface might be used for system control and monitoring.

In one embodiment, the enclosure controller 910 is responsive to commands over the external interface to load a disc 140, read and write data, and perform other operations. In one example, the enclosure controller 910 communicates with the robotic controller (disc carrier controller 930) to send commands, such as to load a selected disc 140 (FIG. 1) in a selected disc drive 130. The enclosure controller 910 also includes a data buffer for holding read and write data during data transfers.

In one embodiment, the robotic controller (disc carrier controller 930) manages the robotic activities of the high performance optical storage system 100, including controlling the motors, reading optical and other sensor data and communicating state information with the enclosure controller 910. In one embodiment, the robotic controller (disc carrier controller 930) communicates with the enclosure controller 910 over a serial interface. The interface may be wired, such as universal serial bus (USB) over a flex cable, or wireless, such as infrared data association (IRDA), BLUETOOTH®, etc. In one example, on initialization, it is critical for the disc carrier controller 930 to determine the physical state of the high performance optical storage system 100 to prevent damage. If the high performance optical storage system 100 has undergone a controlled shutdown, this state information may be recorded within the library. Even so, this shutdown state needs to be confirmed. The high performance optical storage system 100 may have been powered down in an unknown state, such as by an unintended power loss. For example, before the DRU 125 can move longitudinally, the high performance optical storage system 100 must determine if a disc 140 is in the disc gripper device 410 and if so, position the disc gripper device 410 within the drive carrier prior to a longitudinal move. In one embodiment, the sensors set 920 includes sensors to detect if the disc gripper device 410 is centered, or to the left or right of center. Thus, the disc gripper device 410 can be moved directly to the center position. Similarly, sensors of the sensor set 920 are provided to determine if the disc kicker device 420 is centered, or to the left or right of center. Once both disc gripper device 410 and disc kicker device 420 are centered, the DRU 125 may be moved longitudinally. All these functions are accomplished through means of the set of sensors 920. In one embodiment, optical sensors are used to make the position determinations.

In one embodiment, the high performance optical storage system 100 determines if discs 140 are located within any of the disc drives 130. The disc drives 130 may be queried to see if a disc 140 is loaded and the spindle 810 clamped. It is possible for a disc 140 to remain in a disc drive 130 but not be clamped by the spindle 810. This can be tested by attempting a clamp operation.

In one embodiment, an inventory manger is implemented that includes metadata for each disc 140 in the high performance optical storage system 100. In one example, the metadata may include the media type, bad block table or other initialization information, location of the disc within the enclosure 110, etc. The high performance optical storage system 100 can transmit this initialization information to a disc drive 130 upon the load operation, which substantially shortens the startup time. The inventory manager also queries the disc drive 130 on unload to obtain updates to the media.

In one example, metadata, such as changes in the bad block information, is stored by the inventory manager in nonvolatile storage which may be external to the high performance optical storage system 100. Any system metadata can be periodically flushed to specific locations on the media in the library to create self-described system state, such as for relocating a system. Alternatively, the metadata may be stored on other nonvolatile media in the enclosure controller 910.

In one embodiment, the high performance optical storage system 100 software includes a library executive, which is responsive to read, write, mount and dismount commands from a host system. The library executive forwards mount and dismount commands and information to the disc carrier controller 930. The mount command information includes the disc location in the disc cassette 150 to select and the disc drive 130 to load. The dismount command information includes information on the disc drive 130 to unload and the target location for storing the disc 140 in the disc cassette 150.

Figure 10:
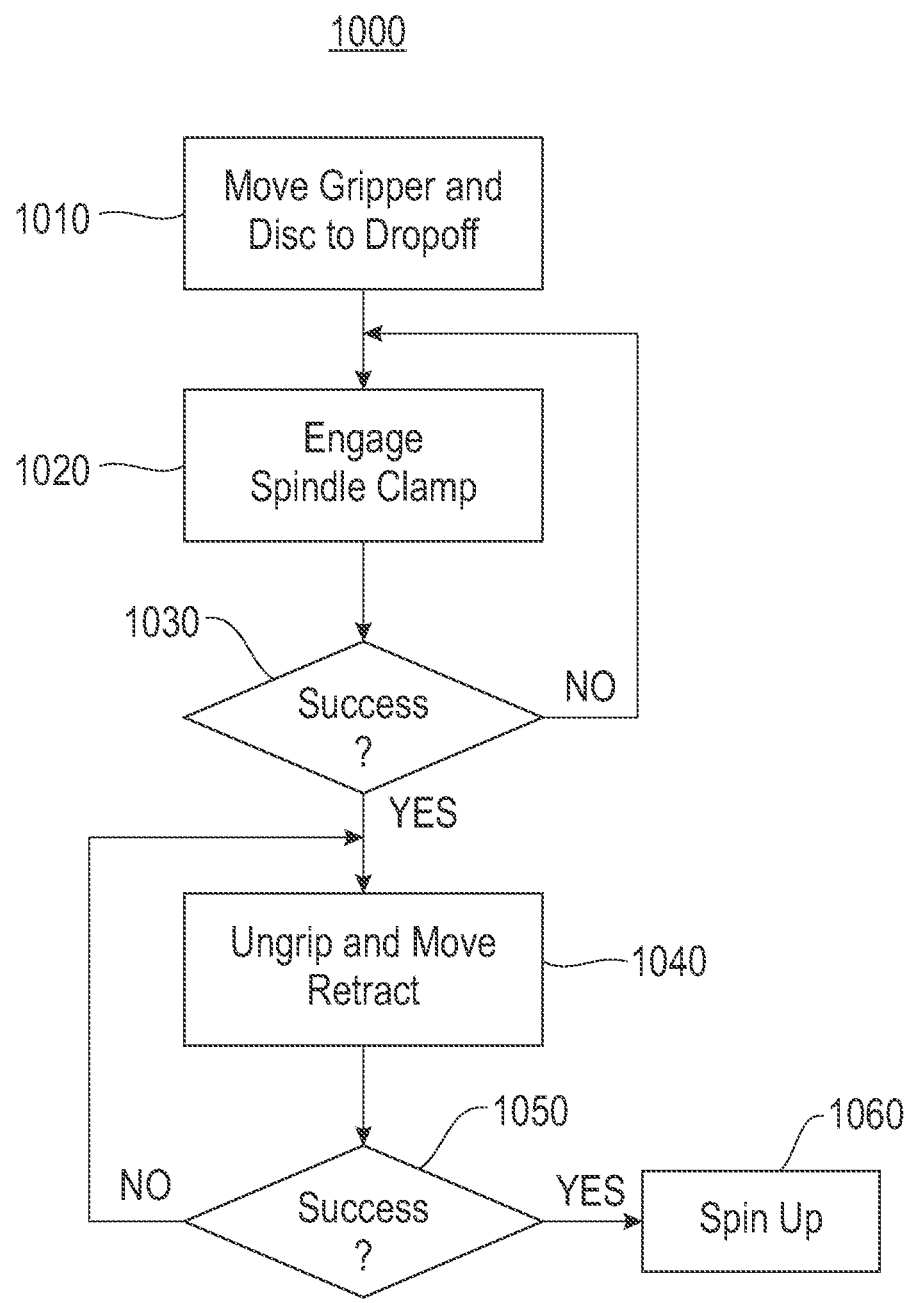
FIG. 10 illustrates a block diagram for a process for disc drop off by the high performance optical storage system, according to one embodiment.

FIG. 10 illustrates a block diagram for a process 1000 for disc 140 drop off by the high performance optical storage system 100, according to one embodiment. In one embodiment, the dropoff and pickup of discs 140 (FIG. 1) directly at the spindle 810 (FIGS. 8A-E) may be facilitated by adjusting the operational timing of the disc drive 130. In conventional disc drives, the operation of engaging the spindle clamp spins up the spindle motor as soon as the clamp engages. Similarly, unloading the disc generally disengages the spindle clamp once the spindle motor has stopped spinning. In one embodiment, it is advantageous to separate the motor spinning from the spindle clamp engagement, as shown in process 1000 (error recovery paths where operations have failed are not shown for clarity). The dropoff operation involves the following. In block 1010 the disc gripper device 410 moves the disc 140 into the dropoff position. Once this is achieved, in block 1020 the spindle clamp may be engaged. At this point, the disc 140 is still secured in the disc gripper device 410. The disc is released from the disc gripper device 410 and the disc gripper device 410 is retracted. In block 1030 it is determined whether the spindle clamp is successfully engaged or not. If the spindle clamp is not successfully engaged, the process 1000 returned to block 1020. Otherwise, process 1000 proceeds to block 1040. In block 1040 where the disc gripper device 410 is un-gripped and retracted. In block 1050 it is determined whether the disc 140 was successfully un-gripped and retracted. If the disc 140 was not successfully un-gripped and the disc gripper device 410 retracted, process 1000 returns to block 1040. At this point the DRU 125 is free to perform an operation on a different disc 140. Once the disc 140 is released the spindle motor may be spun up in block 1060. In one example, it may be desirable to delay the spin up until the disc gripper device 410 has retracted if there are clearance issues.

Figure 11:
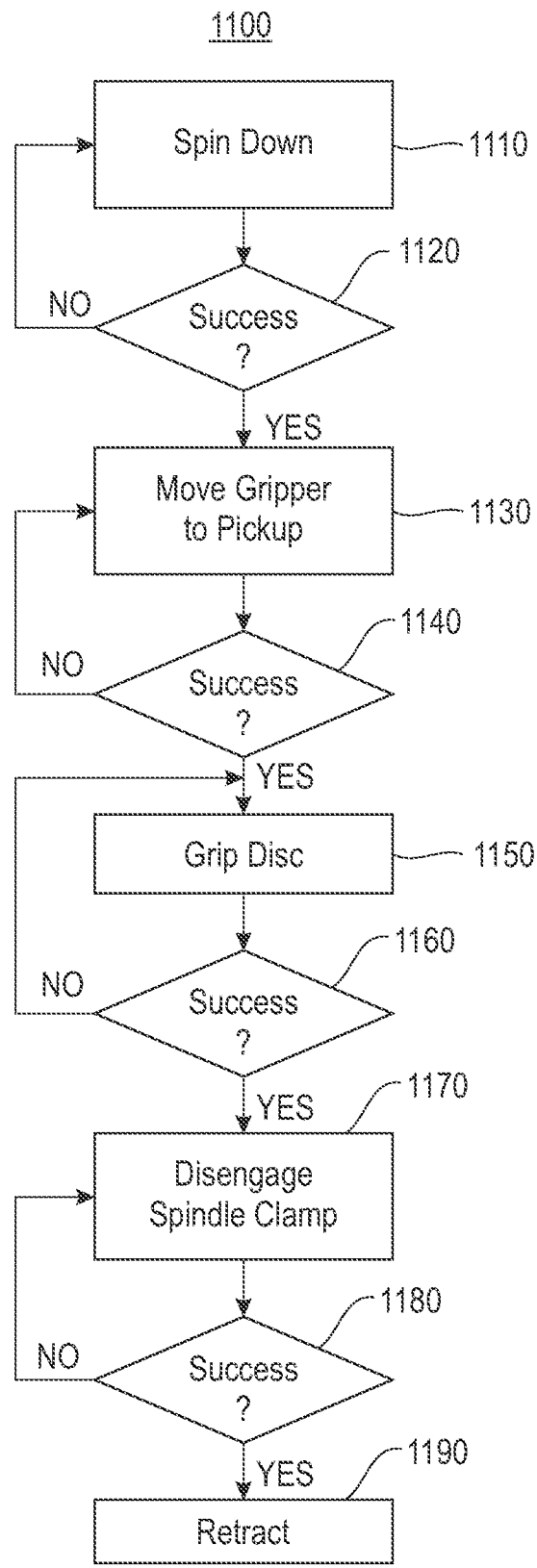
FIG. 11 illustrates a block diagram for a process for disc pickup by the high performance optical storage system, according to one embodiment.

FIG. 11 illustrates a block diagram for a process 1100 for disc pickup by the high performance optical storage system 100, according to one embodiment. In one embodiment, the pickup process 1100 is roughly the inverse sequence to the dropoff process 1000 (FIG. 10). In block 1110 the spindle motor is spun down. In block 1120 it is determined whether the spindle motor has successfully spun down or not. If the spindle motor has not successfully spun down, process 1100 returns to block 1110. Otherwise, process 1100 proceeds to block 1130 where the spindle has stopped and the disc gripper device 410 is moved to the pickup location. In block 1140 it is determined whether the disc gripper device 410 has moved to the pickup location or not. If the disc gripper device 410 did not move to the pickup location, process 1100 returns to block 1130 and continues to attempt to move to the pickup location. Otherwise process 1100 proceeds to block 1150. In block 1150, the disc gripper device 410 then uses the jaws 415 to clamp the disc 140. In block 1160 it is determined whether the jaws 415 successfully clamped the disc 140 or not. If the jaws did not successfully clamp the disc 140, process 1100 returns to block 1140. Otherwise, process 1100 proceeds to block 1170. In block 1170 once the grip is complete, the spindle clamp is disengaged. In block 1180 it is determined whether the spindle clamp has been successfully disengaged or not. If the spindle clamp has not been successfully disengaged, process 1100 returns to block 1170. Otherwise, process 1100 proceeds to block 1190 where the disc gripper device 410 can retract with the disc 140. If there is no interference issue, then the disc gripper device 410 may be moved to the pickup position prior to the spindle having stopped.

Some embodiments include techniques and components for improving the reliability of the disc kicker device 420 (see FIGS. 4, 6, 7, and 12-15) in the high performance optical storage system 100 (FIG. 1). In the high performance optical storage system 100, the kick actuator of the disc kicker device 420 can become mis-aligned at the kicker tip 710 (see FIGS. 7 and 12-15). In some embodiments, the misalignment at the kicker tip 710 is a correctable fault for a small enough displacement. The reliability of disc 140 (see FIGS. 1-8E and 12) pick-up process is adversely affected if the displacement is not corrected.

Figure 12:
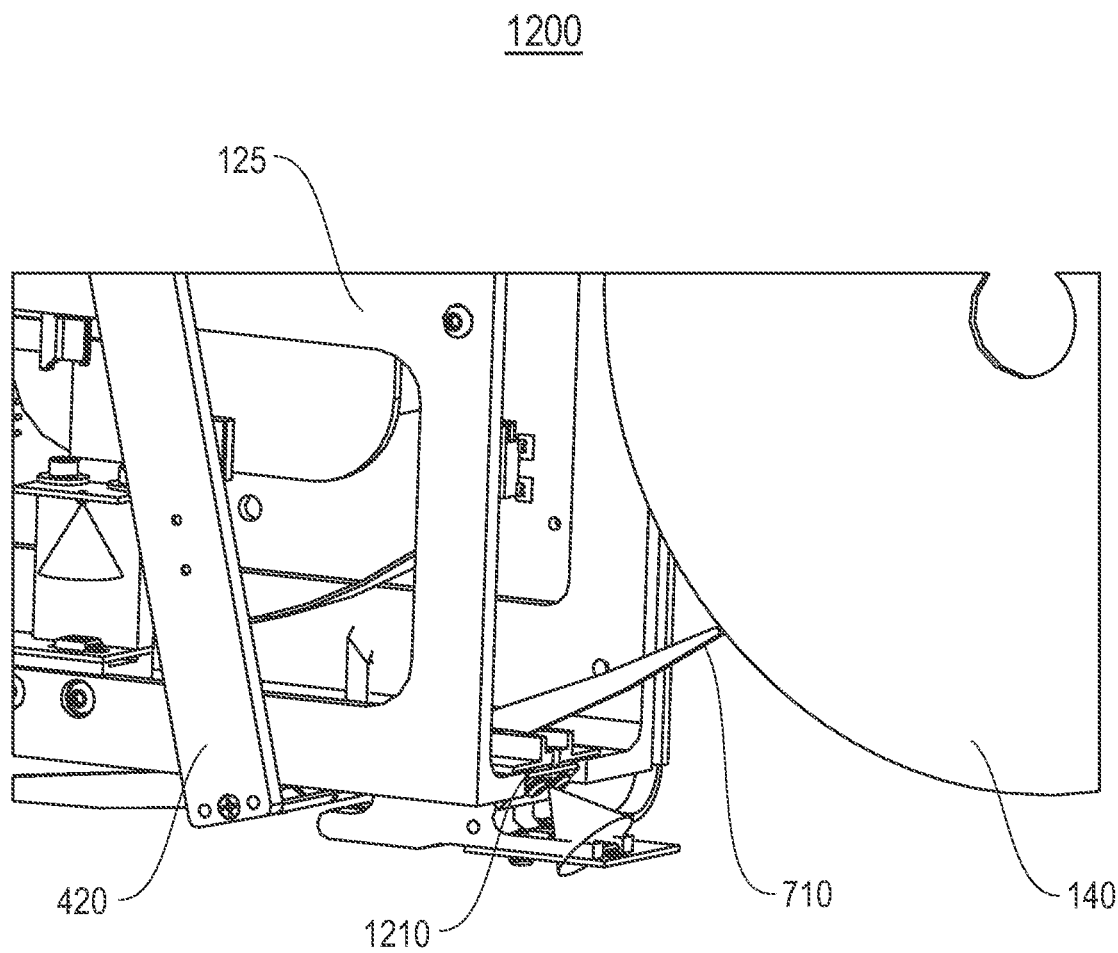
FIG. 12 illustrates an optical sensor employed with the disc kicker device for aligning the movable arm with the selected disc, according to one embodiment.

FIG. 12 illustrates a calibration system 1200 including an optical sensor 1210 employed with the disc kicker device 420 for aligning the movable arm 120 and the kicker device 420 with a disc 140 (see FIGS. 1-8E and 12), according to one embodiment. While the disc kicker device 420 is installed straight and true, it is possible that it (or its holder) becomes slightly warped during operation, such that the kicker tip 710 of the disc kicker device 420 is no longer aligned with the optical disc 140 as it sits in the disc cassette 150 (see, e.g., FIGS. 3 and 7). The alignment is critical to reliably actuating a single disc 140 for selection: a misalignment may raise or scratch an adjacent disc 140. In one embodiment, if the high performance optical storage system 100 (FIG. 1) robotics is aware of an alignment delta then it can compensate by realigning the moveable arm 120 (see, e.g., FIGS. 1, 2, 5, 6 and 8B-D) during the kick operation (kicking a disc 140 to be grabbed by the disc gripper device 410 (see, e.g., FIGS. 5, 6 and 8B-D). The location of the kicker tip 710 is determined by moving the moveable arm 120 until a fiducial sensor (e.g., fiducial sensor 1310, FIG. 13, fiducial sensor 1410, FIG. 14) is triggered by the kicker tip 710. In one embodiment, the fiducial sensor is fixed at a constant distance from a disc alignment sensor (e.g., optical sensor 1210, FIGS. 12-15).

In one embodiment, the disc kicker device 420 in the high performance optical storage system 100 has two tips on the kicker tip 710, and a separate alignment sensor for each side of the kicker tip 710 is necessary. For example, a first fiducial sensor may be contained in a special eject cartridge on one side, and the second fiducial sensor is located on a disk cassette 150 (see also FIGS. 3 and 7) end-stop on the other side of the kicker tip 710. The registration between the kicker tip 710 and the disc 140 must be precise, and the optical sensor 1210 is used to locate fiducial (optical) nubs 1320 (FIGS. 13-15) on the disc cassette 150. The optical sensor 1210 is mechanically aligned with the disc guide 620 (see, e.g., FIG. 6) that the disc kicker device 420 travels through.

Figure 13:
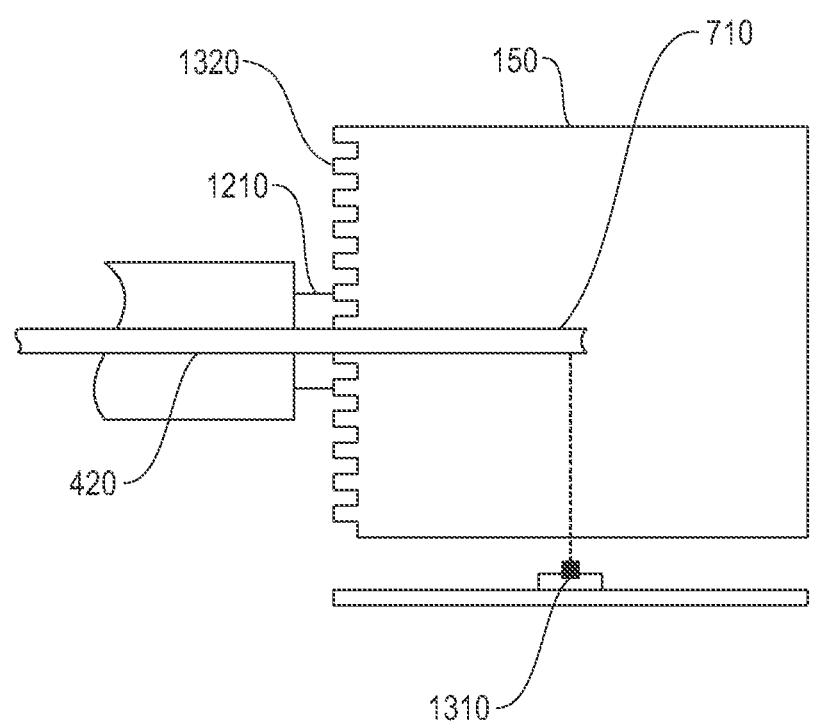
FIG. 13 illustrates a switch detector employed with the disc kicker device for aligning the kicker tip with a disc, according to one embodiment.

FIG. 13 illustrates a calibration system 1300 including a switch detector 1310 (e.g., a fiduciary switch detector) employed with the disc kicker device 420 for aligning the kicker tip 710 with a disc 140 (see FIGS. 1-8E and 12), according to one embodiment. The position of the moveable arm 120 (see, e.g., FIGS. 1, 2, 5, 6 and 8B-D) is determined by reading fiducial nubs 1320 with the optical sensor 1210 to find the position, $y_1$, of the optical sensor 1210 relative to the disc cassette 150. In one embodiment, the moveable arm 120 is moved to a special calibration area and the disc kicker device 420 is extended so that the kicker tip 710 is aligned with the switch detector 1310 of a known position. The moveable arm 120 is then moved closer to the switch detector 1310 until the switch detector 1310 is activated by the kicker tip 710. At this point the moveable arm 120 position, $y_2$, is measured. In one embodiment, when the disc kicker device 420 is in a known true alignment, the value $\Delta_y = y_1 - y_2$ is stored for reference as $\Delta_y^{ref}$. On subsequent measurements, the value of $\Delta_y$ is compared with $\Delta_y^{ref}$, and the difference is used to compensate the moveable arm 120 position when actuating a disc 140.

In one embodiment, the switch detector 1310 is replaced with a non-contact optical detector. In an example embodiment, the non-contact optical detector may be a reflective proximity sensor, a beam interrupter, etc. In another embodiment, the switch detector 1310 is replaced with an electrical contact that is at a voltage potential relative to the grounded metal disc kicker device 420. In this embodiment, when the disc kicker device 420 touches the contact, a current flows that can be detected.

In one embodiment, the switch detector 1310 is replaced with a capacitive plate with an alternating polarity voltage applied through an impedance device (e.g., a resistor, etc.). When the kicker tip 710 is in close proximity to the capacitive plate, the mutual capacitance between the disc kicker device 420 and the capacitive plate will reduce the peak potential on the capacitive plate, which is detected.

In yet another embodiment, the switch detector 1310 is replaced with a hard (mechanical) stop. In this embodiment, the disc kicker device 420 is gently moved against the stop while measuring the force applied to the moveable arm 120 (e.g., through the current drawn by the moveable arm 120 motor). The force will increase when the kicker tip 710 contacts the stop, which is detected.

Figure 14:
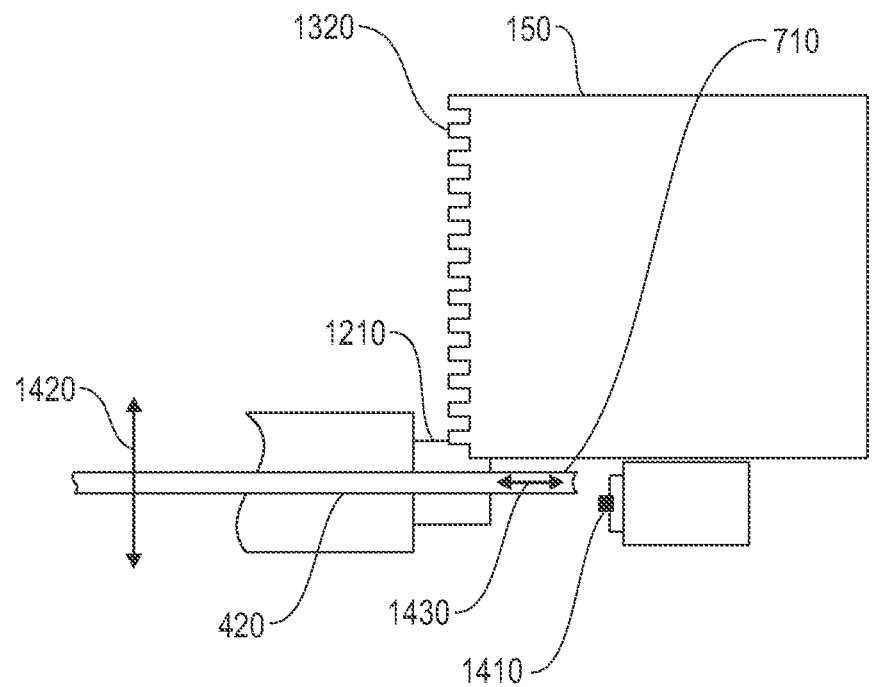
FIG. 14 illustrates a switch employed with the disc kicker device for aligning the kicker tip with a disc, according to one embodiment.

FIG. 14 illustrates a calibration system 1400 including a switch 1410 employed with the disc kicker device 420 for aligning the kicker tip 710 with a disc 140 (see FIGS. 1-8E and 12), according to one embodiment. In one embodiment, the switch 1410 is narrow, and can only be actuated when the kicker tip 710 is within a well defined range of positions. The moveable arm 120 (see, e.g., FIGS. 1, 2, 5, 6 and 8B-D) moves to a position (in either direction of the arrow 1420) where the disc kicker device 420, when actuated, activates the switch 1410 by movement of the kicker tip 710 (which moves in either direction of the arrow 1430). The moveable arm 120 then moves to a position where the actuated disc kicker device 420 will not activate the switch 1410. In one embodiment, by a process of "homing in," the point where the disc kicker device 420 is just barely being activated by the switch 1410 can be determined.

Figure 15:
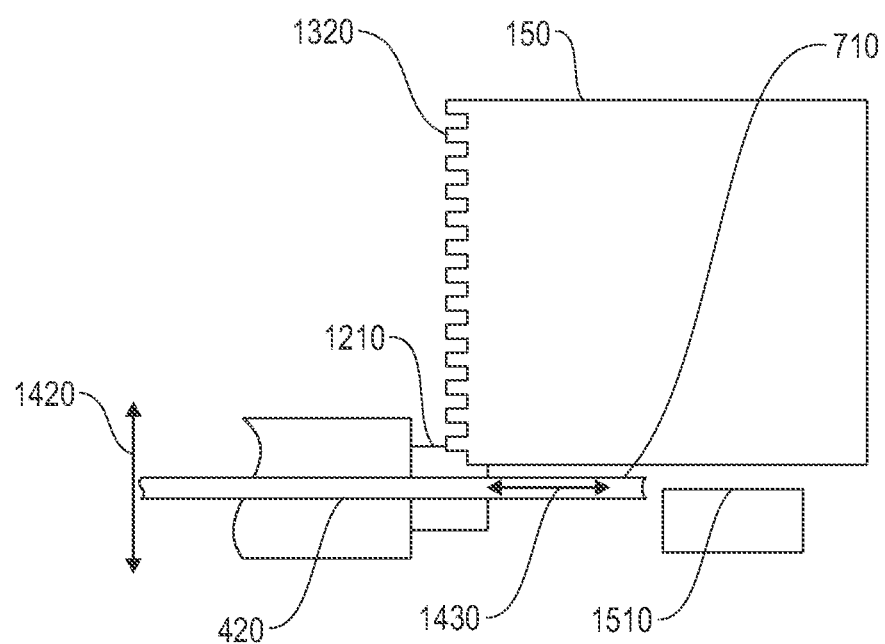
FIG. 15 illustrates a go/no-go edge employed with the disc kicker device for aligning the kicker tip with a disc, according to one embodiment.

FIG. 15 illustrates a calibration system 1500 including a go/no-go edge (fiducial edge 1510) employed with the disc kicker device 420 for aligning the kicker tip 710 with a disc 140 (see FIGS. 1-8E and 12), according to one embodiment. Note that in other embodiments, the fiducial edge 1510 may be replaced with a slot. In one embodiment, the high performance optical storage system 100 (FIG. 1) includes a disc kicker device 420 stop with a fiducial edge 1510. The disc kicker device 420 can either pass by the fiducial edge 1510 (or slot), or be blocked from passing by the fiducial edge 1510. In one embodiment, by applying torque to the disc kicker device 420 and determining where the disc kicker device 420 stops, the position of go/no-go for the kicker tip 710 can be determined. In one embodiment, the state of go or no-go is determined from the measured position of the disc kicker device 420 at the end of travel, or by relative timing of the onset of stall current in the disc kicker device 420 motor.

Figure 16:
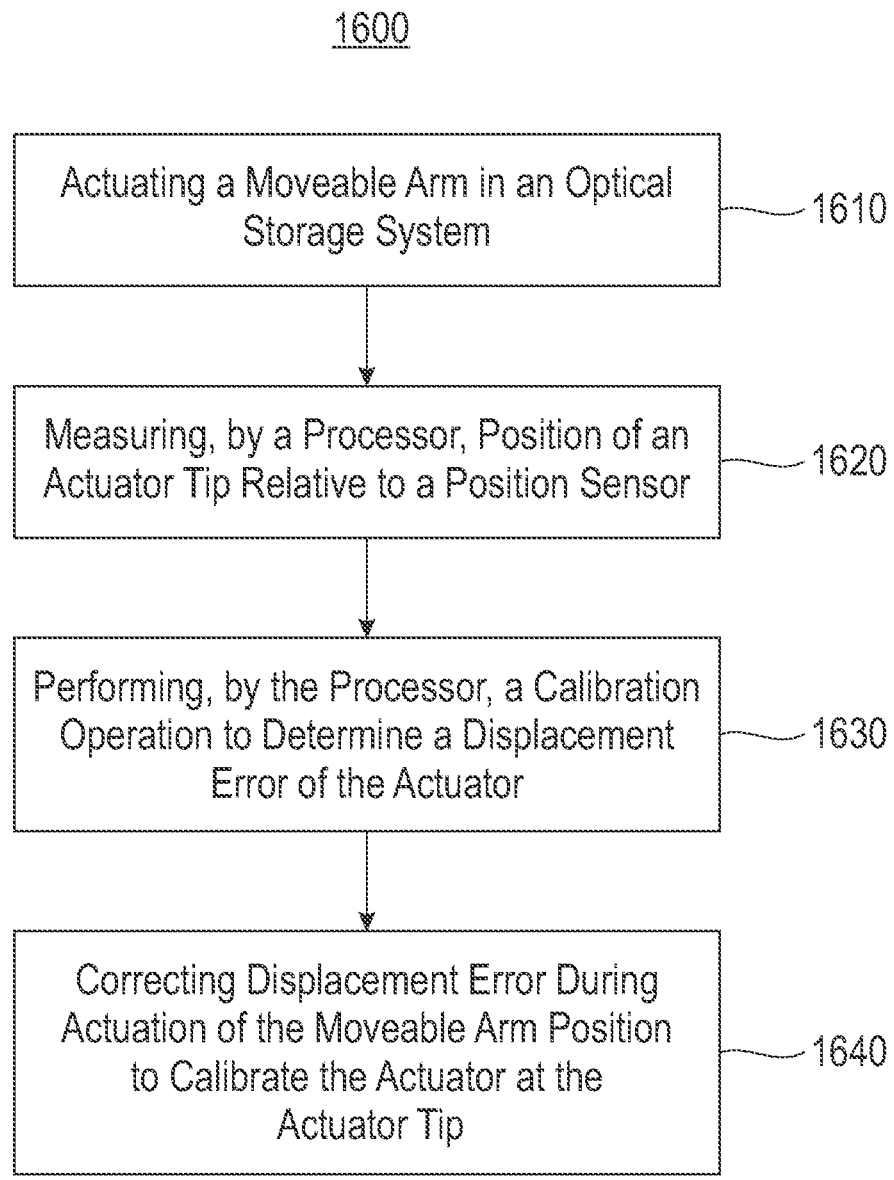
FIG. 16 illustrates a block diagram for a process for calibrating a disc actuator in a high performance optical storage system, according to one embodiment.

FIG. 16 illustrates a block diagram for a process 1600 for calibrating a disc actuator (e.g., an actuator of the disc kicker device 420, FIG. 4, FIGS. 13-15) in a high performance optical storage system (e.g., the high performance optical storage system 100, FIG. 1), according to one embodiment. In block 1610, process 1600 actuates a moveable arm (e.g., moveable arm 120, FIGS. 1, 2, 5, 6 and 8B-D) in the optical storage system. In block 1620, process 1600 measures, by a processor (e.g., a processor in the high performance optical storage system 100, CPU 912, FIG. 9, a processor in the disc carrier controller 930, etc.), position of an actuator tip (e.g., kicker tip 710, FIG. 7, FIGS. 12-15) relative to a position sensor (e.g., optical sensor 1210, FIGS. 12-15). In block 1630, process 1600 performs, by the processor, a calibration operation to determine a displacement error of the disc actuator. In block 1640, process 1600 corrects displacement error during actuation of the moveable arm position to calibrate the disc actuator at the actuator tip.

In one embodiment, in process 1600 the position sensor measures position of the actuator tip relative to the position sensor. In one embodiment, in process 1600 the position sensor registers location of a base of the disc actuator with respect to position of an optical disc (e.g., disc 140, FIGS. 1-8E and 12).

In one embodiment, in process 1600 a switch (e.g., fiducial sensor 1310, FIG. 13, fiducial sensor 1410, FIG. 14) that detects position of the actuator tip upon depression of the switch based on movement of the moveable arm causing the actuator tip to depress the switch. In one embodiment, in process 1600 an optical proximity sensor (e.g., optical sensor 1210, FIGS. 12-15) that detects the position of the actuator tip based on movement of the moveable arm causing the actuator tip to activate the optical proximity sensor.

In one embodiment, in process 1600 an electrical circuit detects the position of the actuator tip based on the actuator tip closing the electrical circuit by movement of the moveable arm. In one embodiment, in process 1600 a driven electrical element is used to detect position of the actuator tip upon movement of the moveable arm that causes the actuator tip to modify measured capacitance of the driven electrical element.

In one embodiment, in process 1600 a mechanical stop (e.g., fiducial edge 1510, FIG. 15) is used to detect the position of the actuator tip based on movement of the moveable arm causing the actuator tip to contact the mechanical stop and measuring a change in force. In one embodiment, in process 1600 the mechanical stop provides for the actuator tip to pass the mechanical stop upon being in an aligned state and prevents the actuator tip from passing by the mechanical stop upon in a misaligned state.

As will be appreciated by one skilled in the art, aspects of the embodiments may be a system, a method, and/or a computer program product at any possible technical detail level of integration. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Aspects of the embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the various embodiments with various modifications as are suited to the particular use contemplated.

What is claimed is:

1. An apparatus comprising:
    a moveable arm configured for movement within an optical disc storage system;
    a disc gripper device coupled to the moveable arm;
    a disc kicker device including an actuator and an actuator tip that contacts an optical disc, the disc kicker device is coupled to the moveable arm;
    a calibration system configured to: determine a displacement error between the actuator tip and the optical disc, and perform a calibration operation to calibrate the actuator at the actuator tip to correct the displacement error.

2. The apparatus of claim 1, wherein the calibration system includes a position sensor that measures position of the actuator tip relative to the position sensor.

3. The apparatus of claim 2, wherein the position sensor is an optical sensor that registers location of a base of the actuator with respect to position of an optical disc.

4. The apparatus of claim 2, wherein a switch of the calibration system detects position of the actuator tip upon depression of the switch based on movement of the moveable arm causing the actuator tip to depress the switch.

5. The apparatus of claim 2, wherein an optical proximity sensor of the calibration system detects the position of the actuator tip based on movement of the moveable arm causing the actuator tip to activate the optical proximity sensor.

6. The apparatus of claim 2, wherein the calibration system includes an electrical circuit that detects the position of the actuator tip that closes the circuit based on movement of the moveable arm.

7. The apparatus of claim 2, wherein the calibration system includes a driven electrical element that is used to detect position of the actuator tip upon movement of the moveable arm that causes the actuator tip to modify measured capacitance of the driven electrical element.

8. The apparatus of claim 2, wherein the calibration system includes a mechanical stop that is used to detect the position of the actuator tip based on movement of the moveable arm that causes the actuator tip to contact the mechanical stop and measurement of a change in force.

9. The apparatus of claim 1, wherein a mechanical stop of the calibration system provides for the actuator tip to pass the mechanical stop upon being aligned and prevents the actuator tip from passing by the mechanical stop upon being misaligned.

10. The apparatus of claim 1, wherein during actuation the moveable arm position is corrected by a measured position of the actuator tip from the calibration operation.

11. A calibration system comprising:
    a moveable arm configured for movement within an optical disc storage system; and a disc kicker device including an actuator and an actuator tip that contacts an optical disc, the disc kicker device is coupled to the moveable arm, wherein the calibration system: determines a displacement error between the actuator tip and the optical disc, and performs a calibration operation to calibrate the actuator at the actuator tip to correct the displacement error.

12. The system of claim 11, further comprising a position sensor that measures position of the actuator tip relative to the position sensor.

13. The system of claim 12, wherein the position sensor is an optical sensor that registers location of a base of the actuator with respect to position of an optical disc.

14. The system of claim 12, further comprising a switch that detects position of the actuator tip upon depression of the switch based on movement of the moveable arm causing the actuator tip to depress the switch.

15. The system of claim 12, further comprising an optical proximity sensor that detects the position of the actuator tip based on movement of the moveable arm causing the actuator tip to activate the optical proximity sensor.

16. The system of claim 12, further comprising an electrical circuit that detects the position of the actuator tip based on the actuator tip closing the electrical circuit by movement of the moveable arm.

17. The system of claim 12, further comprising a driven electrical element that is used to detect position of the actuator tip upon movement of the moveable arm causing the actuator tip to modify measured capacitance of the driven electrical element.

18. The system of claim 12, further comprising a mechanical stop that is used to detect the position of the actuator tip based on movement of the moveable arm causing the actuator tip to contact the mechanical stop and measurement of a change in force.

19. The system of claim 11, further comprising a mechanical stop that provides for the actuator tip to pass the mechanical stop upon being in an aligned state and prevents the actuator tip from passing by the mechanical stop upon in a misaligned state.

20. A method of calibrating an actuator in an optical disc storage system, the method comprising:

actuating a moveable arm in the optical storage system;

measuring, by a processor, position of an actuator tip relative to a position sensor;

performing, by the processor, a calibration operation to determine a displacement error of the actuator; and correcting displacement error during actuation of the moveable arm position to calibrate the actuator at the actuator tip, wherein the actuator tip contacts an optical disc in the optical storage system.

* * * * *